(12) United States Patent
Kawanishi et al.

(10) Patent No.: US 10,160,612 B2
(45) Date of Patent: Dec. 25, 2018

(54) SHEET CONVEYING APPARATUS

(71) Applicant: CANON KABUSHIKI KAISHA, Tokyo (JP)

(72) Inventors: Masahiro Kawanishi, Yokohama (JP); Kazuyuki Morinaga, Machida (JP); Kuniaki Sato, Inagi (JP); Makoto Takemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/631,279

(22) Filed: Jun. 23, 2017

(65) Prior Publication Data

US 2018/0009613 A1    Jan. 11, 2018

(30) Foreign Application Priority Data

Jul. 11, 2016  (JP) ................................ 2016-136812
Jul. 11, 2016  (JP) ................................ 2016-136815
Jul. 11, 2016  (JP) ................................ 2016-136853
Jul. 11, 2016  (JP) ................................ 2016-136854

(51) Int. Cl.
*B65H 5/02* (2006.01)
*G03G 15/23* (2006.01)
*G03G 15/00* (2006.01)
*H04N 1/00* (2006.01)

(52) U.S. Cl.
CPC ............. *B65H 5/025* (2013.01); *G03G 15/23* (2013.01); *G03G 15/231* (2013.01); *G03G 15/6529* (2013.01); *H04N 1/00* (2013.01); *B65H 2405/324* (2013.01); *B65H 2515/81* (2013.01); *B65H 2801/39* (2013.01)

(58) Field of Classification Search
CPC .... B65H 5/062; B65H 5/026; B65H 2511/13; B65H 2405/324; B65H 3/40; B65H 2515/81
USPC ........................................................ 271/162
See application file for complete search history.

(56) References Cited

U.S. PATENT DOCUMENTS

| 5,083,880 | A | * | 1/1992 | Inomata ................. B41J 13/106 |
| | | | | 271/162 |
| 5,398,108 | A | | 3/1995 | Morinaga et al. |
| 5,450,170 | A | | 9/1995 | Kimizuka et al. |
| 5,481,336 | A | | 1/1996 | Tachibana et al. |

(Continued)

FOREIGN PATENT DOCUMENTS

| JP | 06-271136 A | | 9/1994 |
| JP | 06271136 A | * | 9/1994 |
| JP | 2014-094801 A | | 5/2014 |

*Primary Examiner* — Patrick Cicchino
(74) *Attorney, Agent, or Firm* — Venable, LLP

(57) ABSTRACT

Provided is a sheet conveying apparatus that includes a conveying unit capable of changing its posture through rotation, and forms a sheet conveyance path capable of conveying a sheet without fail regardless of which posture the conveying unit is in. A first conveying unit is capable of being in a first posture and in a second posture by rotating from the first posture. In a case where the first conveying unit is in the first posture, a sheet conveyance path is formed in which the first conveyance path, the second conveyance path, and the third conveyance path are connected in this order. In a case where the first conveying unit is in the second posture, a sheet conveyance path is formed in which the first conveyance path and the third conveyance path are connected in this order.

7 Claims, 17 Drawing Sheets

(56) References Cited

U.S. PATENT DOCUMENTS

| | | | |
|---|---|---|---|
| 5,571,265 A | | 11/1996 | Yagi et al. |
| 5,722,654 A | | 3/1998 | Sootome et al. |
| 5,882,003 A | * | 3/1999 | Fujiwara ................ B65H 1/266 |
| | | | 271/10.11 |
| 6,113,093 A | | 9/2000 | Morinaga et al. |
| 6,527,267 B1 | | 3/2003 | Kuwata et al. |
| 6,581,922 B2 | | 6/2003 | Kuwata et al. |
| 6,643,480 B2 | | 11/2003 | Kuwata et al. |
| 6,674,976 B2 | | 1/2004 | Sato et al. |
| 7,338,043 B2 | * | 3/2008 | Sorenson ................ B65H 5/26 |
| | | | 271/162 |
| 8,096,545 B2 | * | 1/2012 | Wang ................ H04N 1/00559 |
| | | | 271/162 |
| 8,840,112 B2 | * | 9/2014 | Takahata ................ B65H 7/02 |
| | | | 271/301 |
| 8,919,761 B2 | | 12/2014 | Morinaga et al. |
| 9,033,332 B2 | | 5/2015 | Sato et al. |
| 9,132,670 B2 | | 9/2015 | Ishizuka et al. |
| 2013/0256981 A1 | * | 10/2013 | Takahata ................ B65H 5/26 |
| | | | 271/225 |

\* cited by examiner

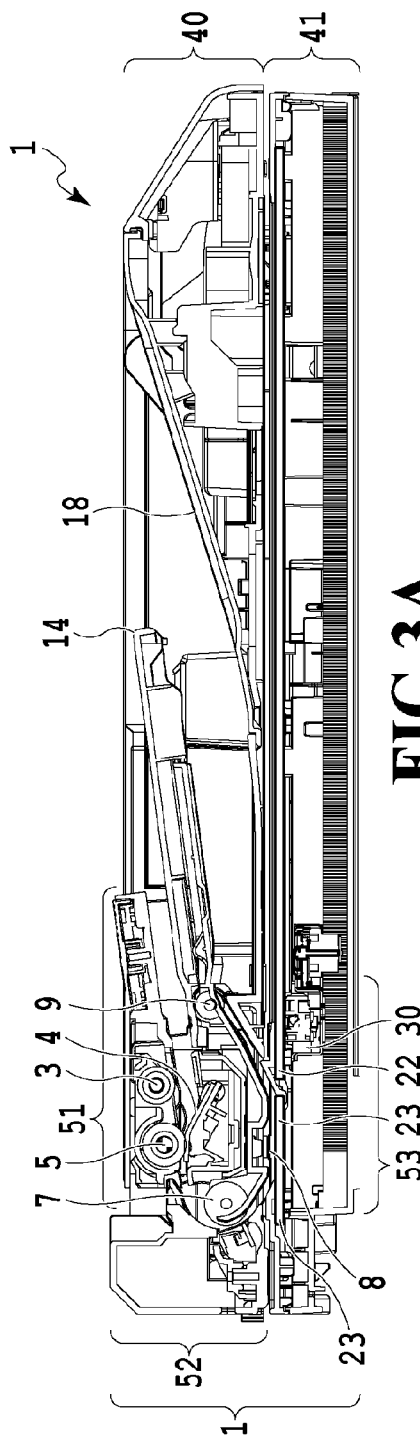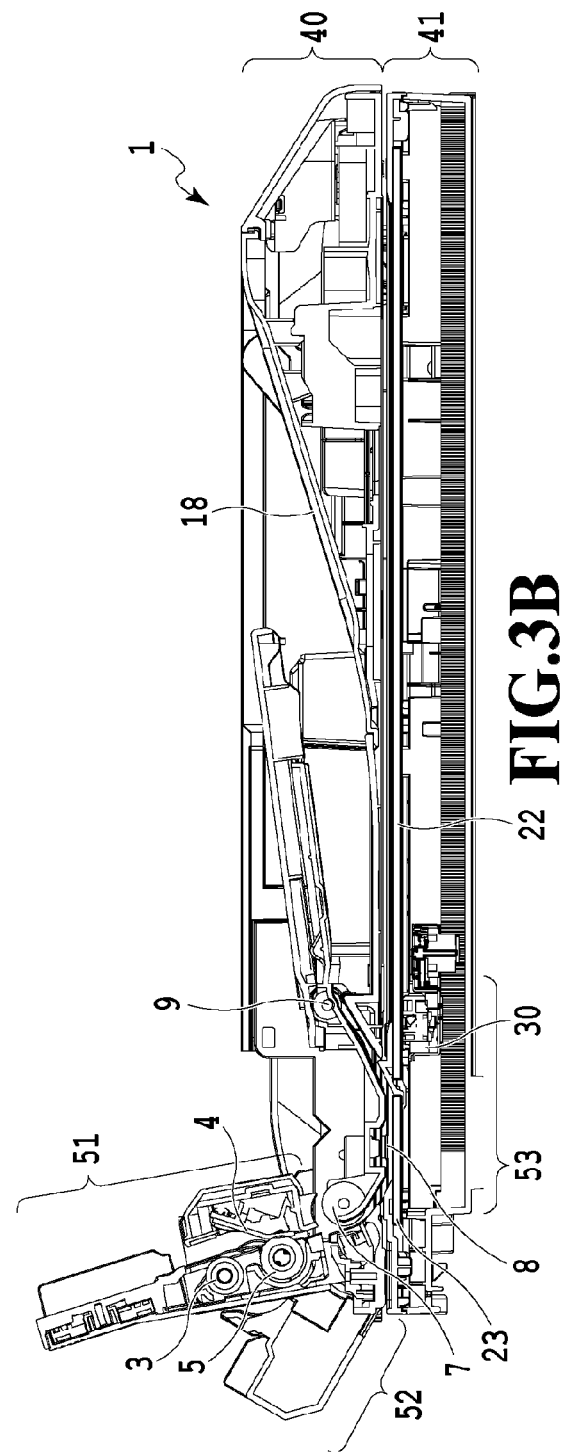

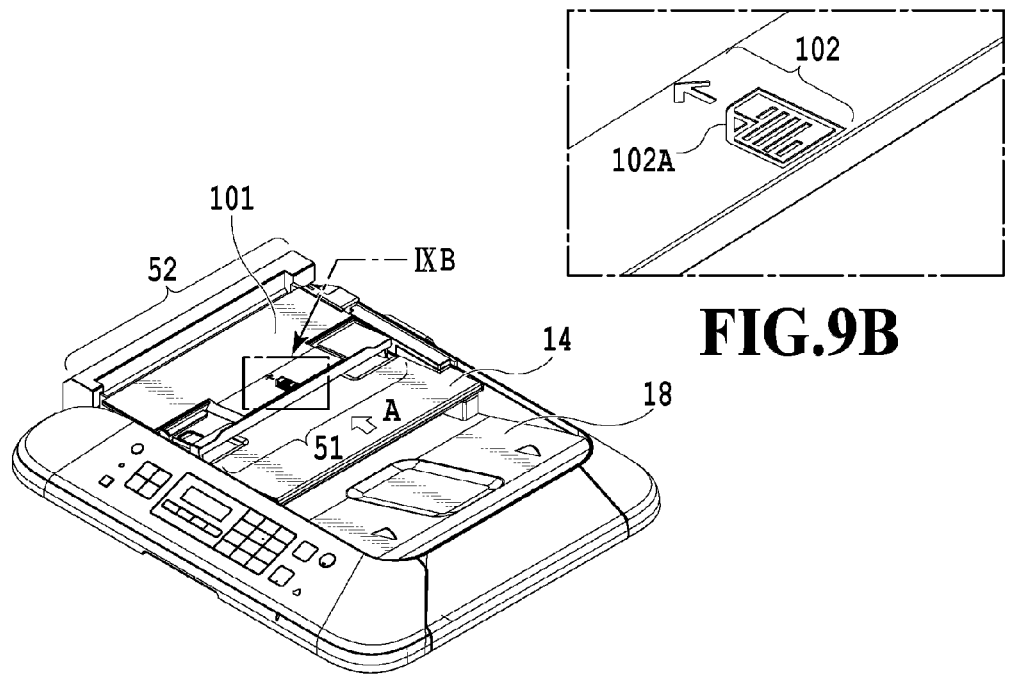
FIG.9B
FIG.9A
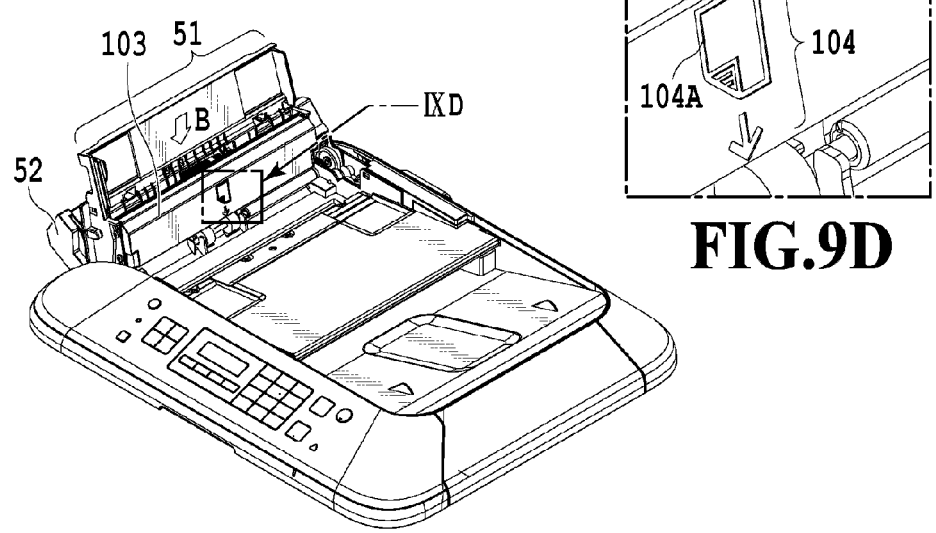
FIG.9D
FIG.9C

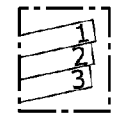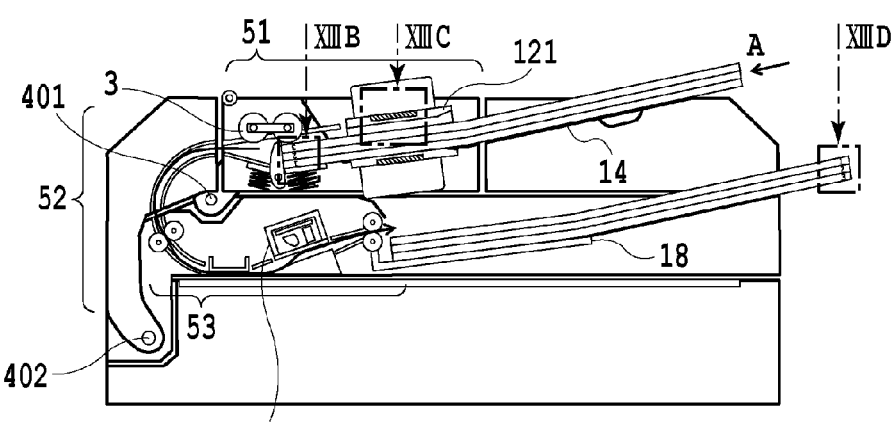
FIG.13A
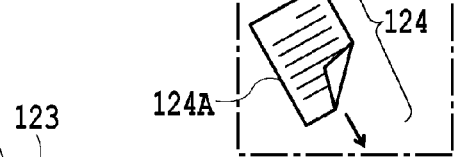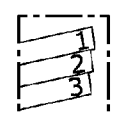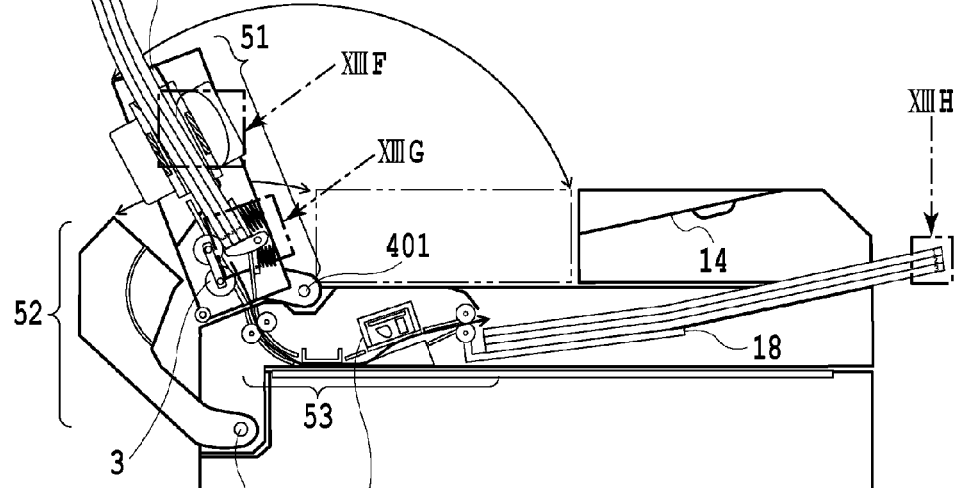
FIG.13E

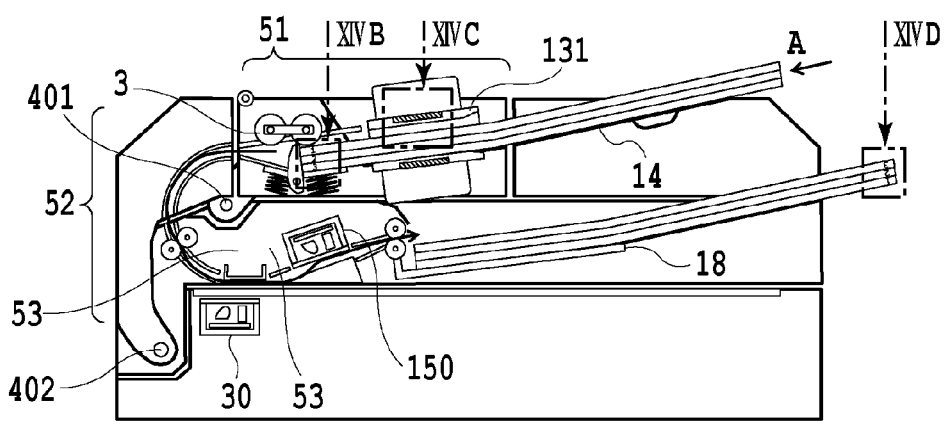
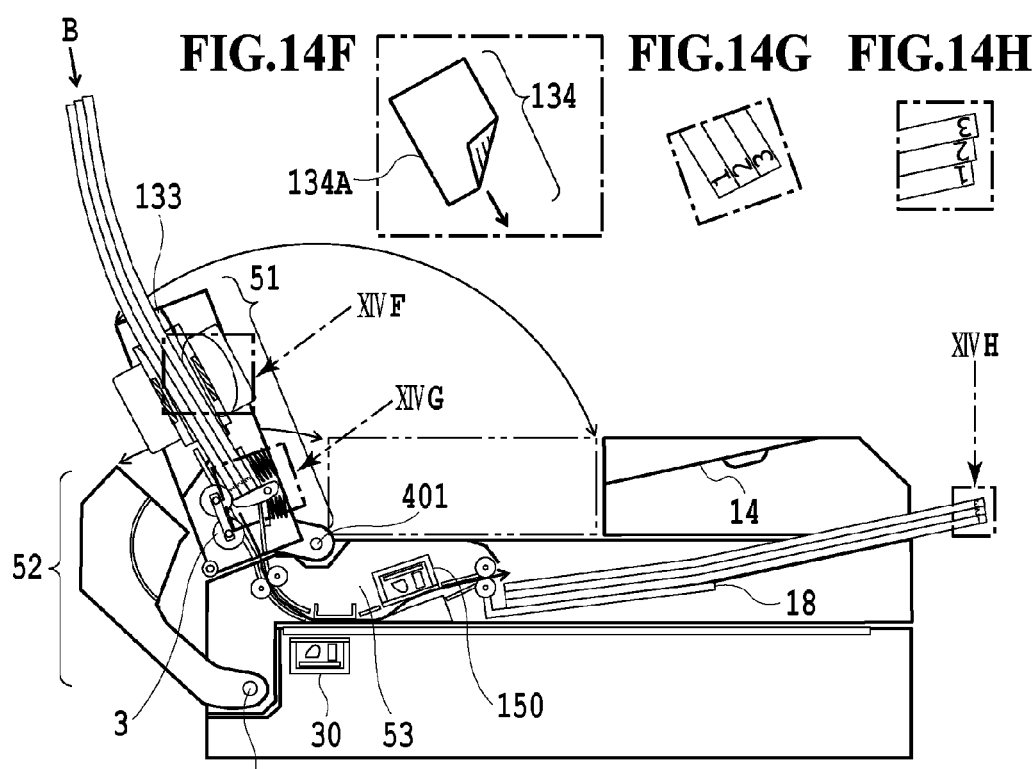

SHEET CONVEYING APPARATUS

BACKGROUND OF THE INVENTION

Field of the Invention

The present invention relates to a sheet conveying apparatus such as an automatic document feeder.

Description of the Related Art

Apparatuses configured to convey a sheet and read document information on the sheet such as scanners, facsimile machines, and copiers use a sheet conveying apparatus for feeding and conveying a sheet for reading. An automatic document feeder (ADF) has been known as such an apparatus, for example. Some types of ADFs include a mechanism configured to switch the conveyance path between a plurality of conveyance paths so that a document sheet such as regular paper can be conveyed through a conveyance path bent in a U-shape (U-turn path) and a thick sheet such as a photograph or a postcard can be conveyed through a conveyance path extending straight (straight path).

Japanese Patent Laid-Open No. H06-271136 (1994) describes a document feeding apparatus in which a movable conveyance path constituting part of a sheet conveyance path is rotatably provided, and this movable conveyance path rotates between two rotational positions to switch the sheet conveyance path between a U-turn path and a straight path.

Here, the conveyance-path switching configuration using the movable conveyance path described in Japanese Patent Laid-Open No. H06-271136 (1994) needs a structure to avoid interference between the movable conveyance path and a fixed conveyance path connected to the movable conveyance path during rotation of the movable conveyance path. However, a specific structure to avoid that interference is not described in Japanese Patent Laid-Open No. H06-271136 (1994).

The present invention provides a sheet conveying apparatus that includes a conveying unit capable of changing its posture through rotation, and forms a sheet conveyance path capable of conveying a sheet without fail regardless of which posture the conveying unit is in.

SUMMARY OF THE INVENTION

The present invention provides a sheet conveying apparatus for conveying placed sheets one by one, including: a first conveying unit configured to provide a first conveyance path; a second conveying unit configured to provide a second conveyance path; and a third conveying unit configured to provide a third conveyance path, in which the first conveying unit is capable of being in a first posture and in a second posture, the second posture being a posture by rotating from the first posture, in a case where the first conveying unit is in the first posture, a sheet conveyance path is formed in which the first conveyance path, the second conveyance path, and the third conveyance path are connected in this order, and in a case where the first conveying unit is in the second posture, a sheet conveyance path is formed in which the first conveyance path and the third conveyance path are connected in this order.

Further features of the present invention will become apparent from the following description of exemplary embodiments with reference to the attached drawings.

BRIEF DESCRIPTION OF THE DRAWINGS

FIG. 3A and FIG. 3B are cross-sectional views of the document reading conveying unit in the first embodiment;

FIG. 9A through FIG. 9D are views explaining indicators on the placement tray to be referred to in a document setting operation in the first embodiment;

FIG. 13A through FIG. 13H are views schematically illustrating cross sections of a document conveying reading unit in a fourth embodiment;

FIG. 14A through FIG. 14H are views schematically illustrating cross sections of a document conveying reading unit in a fifth embodiment;

DESCRIPTION OF THE EMBODIMENTS

Embodiments of the present invention will be described below in detail with reference to the drawings. Note that a sheet conveying apparatus according to the present invention may be provided and used in the body of an image forming apparatus such as a copier, a printer, a facsimile machine, or a multi-function peripheral including them as one of the constituent elements of the image forming apparatus. In this case, the sheet conveying apparatus may be used as part of a configuration for conveying a sheet as a document and reading the sheet with an image reading apparatus, and as part of a configuration for conveying a sheet as a medium and copying an image onto the sheet with an image forming apparatus. Note that the read information read by the image reading apparatus is formed as an image onto a sheet by an image forming unit of the image forming apparatus. That is, an image read by the image reading apparatus is copied onto a sheet by the image forming unit. The following embodiments will use an inkjet multi-function printing apparatus as an example. However, the present invention is also applicable to apparatuses such as non-inkjet copiers and facsimile machines, document scanners exclusively for reading, and the like.

(First Embodiment)

Figure 1:
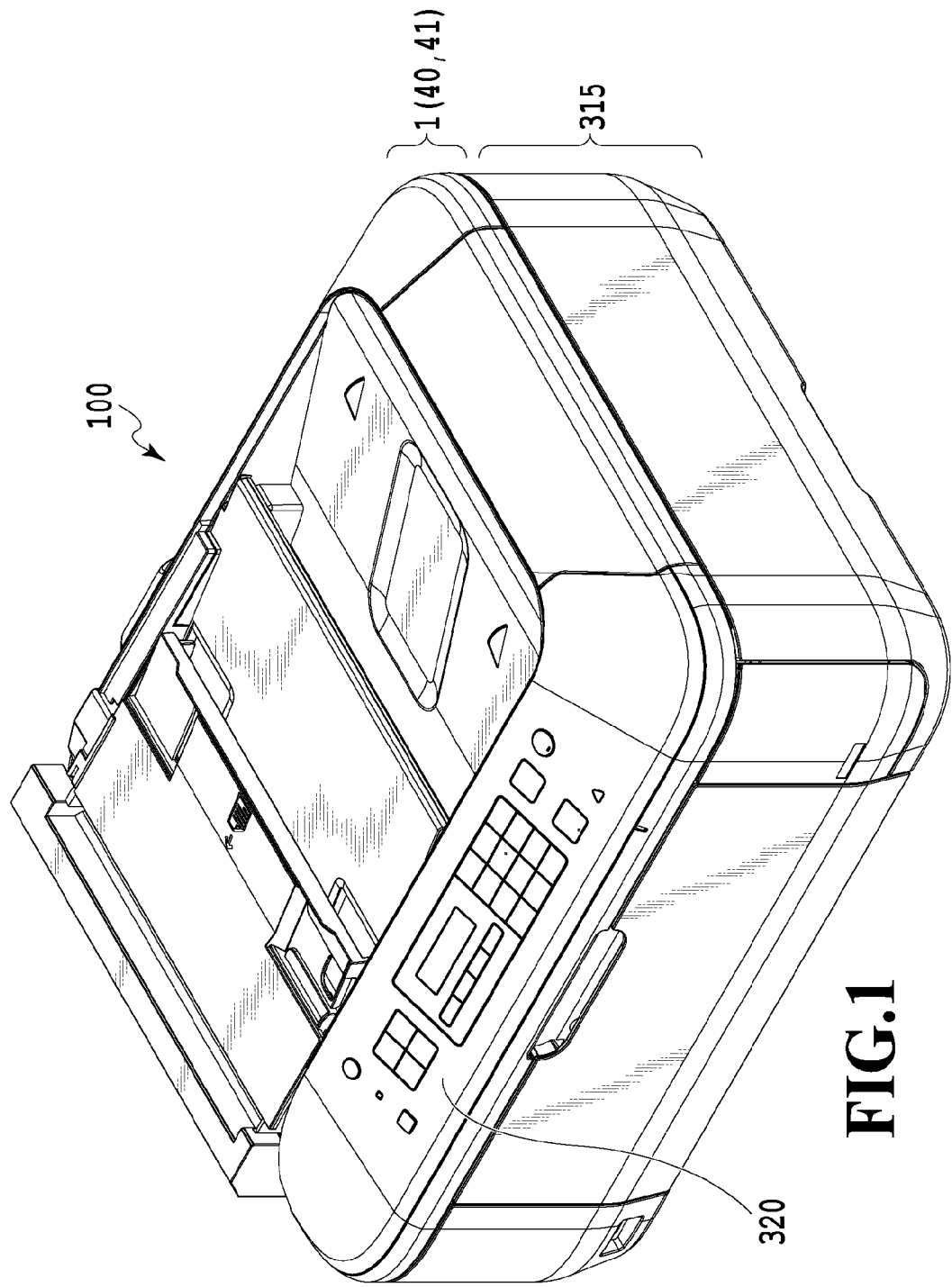
FIG. 1 is a perspective view illustrating a multi-function printing apparatus according to a first embodiment.

FIG. 1 is a perspective view illustrating a multi-function printing apparatus 100 according to an embodiment of the present invention. The multi-function printing apparatus 100 in this embodiment mainly includes a document reading conveying unit 1 and a printing unit 315. The printing unit 315 includes an inkjet print head and prints an image or the like onto a sheet by scanning the print head over the sheet. This printing unit 315 can print document information read by the document reading conveying unit 1 onto a sheet. In other words, the multi-function printing apparatus 100 in this embodiment has the function of a copying apparatus. Also, the printing unit 315 performs a printing operation based on image data sent from a host apparatus.

The document reading conveying unit 1 includes a document loading pressing plate unit 40 including a sheet conveying mechanism, and a reading unit 41 configured to read document information on a sheet. Moreover, the document loading pressing plate unit 40 includes rotatable conveying units to switch a conveyance path between a U-turn path and a straight path and convey a document sheet therethrough, and the reading unit 41 reads a document while it is conveyed through any of these paths. The reading unit 41 of the document reading conveying unit 1 can also read a document placed on a document glass board. For this reading, the whole document loading pressing plate unit 40 is configured to rotate and open so that a document can be placed on the document glass board. The document reading conveying unit 1 further includes an operation panel 320. Thus, the user (operator) can enter various inputs into and obtain information from the multi-function printing apparatus 100 through the operation panel 320. Details of the configuration of the document reading conveying unit 1 will now be described.

Figure 2A:
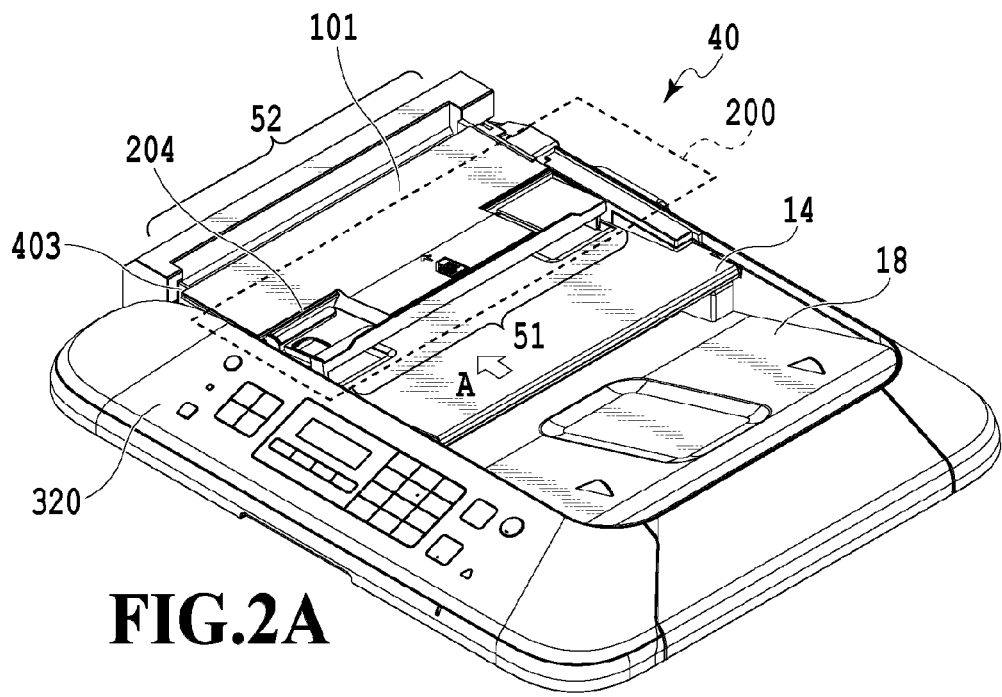
FIG. 2A and FIG. 2B are views illustrating details of a document loading pressing plate unit in a document reading conveying unit in the first embodiment.
Figure 2B:
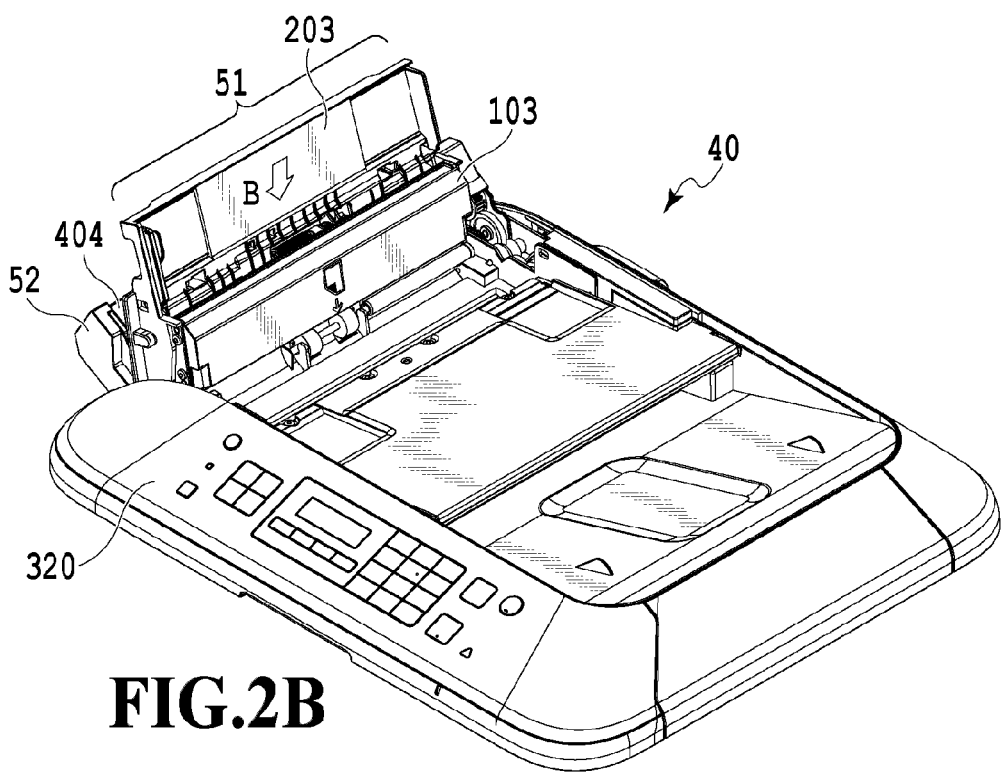

FIG. 2A and FIG. 2B are views illustrating details of the document loading pressing plate unit 40 in the document reading conveying unit 1 illustrated in FIG. 1, and illustrate a state where conveying units form a U-turn path and a state where the conveying units form a straight path, respectively. Also, FIG. 3A and FIG. 3B are cross-sectional views of the document reading conveying unit 1 in the states illustrated in FIG. 2A and FIG. 2B, respectively. In FIG. 2A, FIG. 2B, FIG. 3A, and FIG. 3B, the document loading pressing plate unit 40 of the document reading conveying unit 1 includes a first document conveyance path (provided by a first conveying unit) 51, a second document conveyance path (provided by a second conveying unit) 52, and a third document conveyance path (provided by a third conveying unit) 53. The first document conveyance path 51 is provided to be rotatable about a predetermined rotation shaft. Thus, the U-turn path is formed with the first document conveyance path 51 set in a first posture illustrated in FIG. 2A and FIG. 3A, and the straight path is formed with the first document conveyance path 51 set in a second posture illustrated in FIG. 2B and FIG. 3B.

The first document conveyance path 51 is provided with a pick-up roller 3 configured to contact the uppermost one of a plurality of placed documents S and pick this up. Moreover, a separating roller 5 and a separating pad 4 in pressure contact with each other are provided downstream of the pick-up roller 3 in the sheet conveyance direction for separating and feeding documents S one by one picked up by the pick-up roller 3. The second document conveyance path 52 is connected at its upstream end in the sheet conveyance direction to the first document conveyance path 51 and connected at its downstream end in the sheet conveyance direction to the third document conveyance path 53. These three conveyance paths form a sheet conveyance path. A document discharge tray 18 is provided at the downstream end of the third document conveyance path 53. The third document conveyance path 53 is provided with a first conveying roller 7 and a second conveying roller 9 arranged downstream thereof and configured to discharge a document S onto the document discharge tray 18. Also, to the third document conveyance path 53, a document edge sensor or the like not illustrated is attached which is configured to detect the leading edge and the trailing edge of a document S.

Figure 4A:
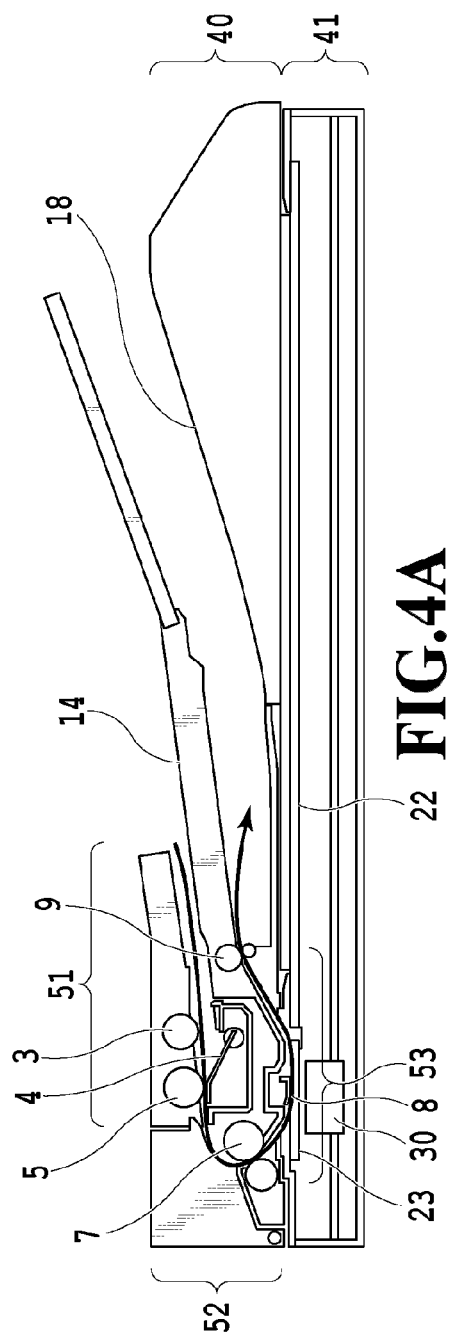
FIG. 4A and FIG. 4B are views illustrating conveyance paths formed by document conveyance paths in the first embodiment.
Figure 4B:
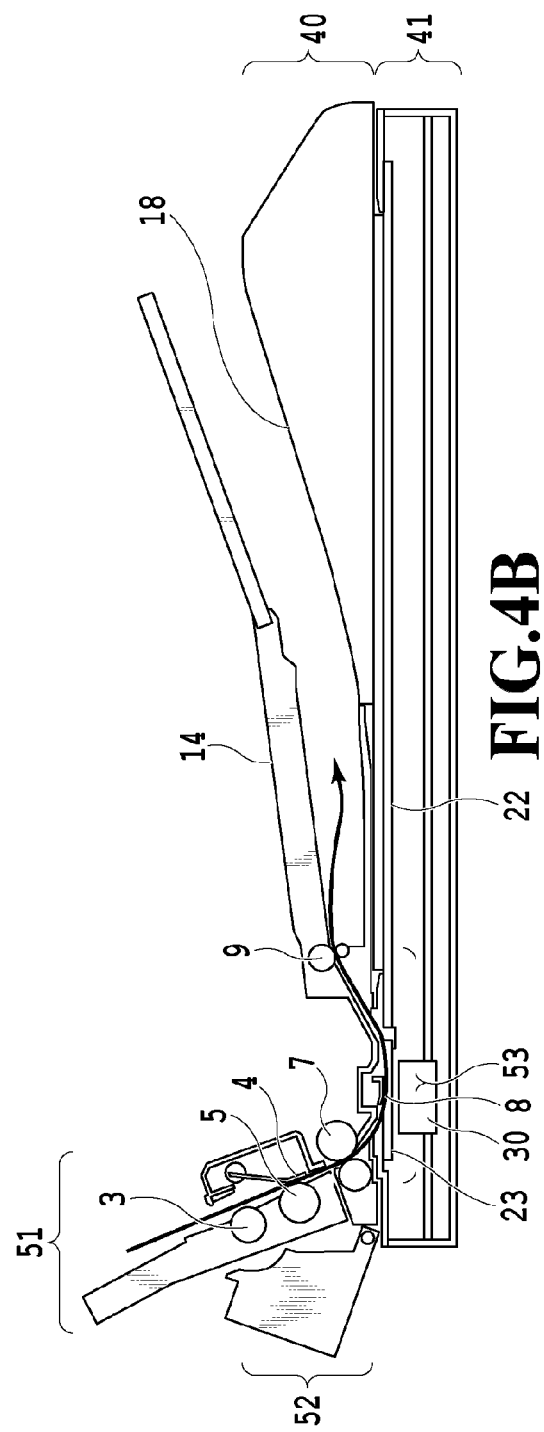

As illustrated in FIG. 3A and FIG. 4A, in a case where the first document conveyance path 51 is in a first rotational position (first posture), the first document conveyance path 51, the second document conveyance path 52, and the third document conveyance path 53 form the conveyance path illustrated by the arrow in FIG. 4A for conveying a document S. This first posture is a nearly horizontal posture. This state of the conveyance path will be hereinafter referred to as the first conveyance mode. Moreover, as illustrated in FIG. 3B and FIG. 4B, in a case where the first document conveyance path 51 is rotated more than 90 degrees about the predetermined rotation shaft into a second rotational position (a position reached by moving to the second posture), the second document conveyance path 52 retracts from the sheet conveyance path. As a result, the first document conveyance path 51 and the third document conveyance path 53 form the conveyance path illustrated by the arrow in FIG. 4B for conveying a document S. This state will be hereinafter referred to as the second conveyance mode. Documents S can be conveyed in either the first conveyance mode or the second conveyance mode. Details of an operation of moving the first document conveyance path 51 from the first posture to the second posture and the mechanism therefor will be described later. Here, FIG. 4A and FIG. 4B are views illustrating the conveyance paths formed by the first to third document conveyance paths 51, 52, and 53, and illustrate the U-turn path and the straight path, respectively.

Referring again to FIG. 2A, FIG. 2B, FIG. 3A, and FIG. 3B, the reading unit 41 includes a contact image sensor (hereinafter referred to as "CIS") 30 and reads a document by using the CIS 30. The CIS 30 is equipped with LEDs and irradiates a document S with light from the LEDs. The light reflected from the document is then formed on sensor elements through a self-focusing-type rod lens array, and the image information is read. The CIS 30 is configured to be movable in the left-right direction in FIG. 3A and FIG. 3B. Thus, in book-document reading (flat bed scanning) in which a document placed on a document glass board 22 is read, the CIS 30 reads the document placed on the document glass board 22 by being scanned from the left side to the right side in FIG. 3A and FIG. 3B. Also, the CIS 30 is stopped and fixed at a sheet-document read position situated under the third document conveyance path 53 (a position opposite to a read white plate 8; the position illustrated in FIGS. 4A and 4B). At this position, the CIS 30 can read document information on a sheet document conveyed along the U-turn path or the straight path through an ADF glass plate 23.

Driving force from a driving motor (not illustrated) is transmitted to the separating roller 5, the pick-up roller 3, the first conveying roller 7, and the second conveying roller 9 through a gear train to be described later with reference to FIG. 7A and FIG. 7B. The driving motor rotates in response to the user's instruction through the operation panel 320 to start a reading operation with the document reading conveying unit 1 in the first conveyance mode, which is illustrated in FIG. 4A. By the rotation, the separating roller 5 and the pick-up roller 3 are rotated and, at the same time, a pick-up arm (not illustrated) is rotated to press the pick-up roller 3 against documents S. By the rotation of the pick-up roller 3, document sheets S are conveyed downstream in the conveyance direction. After the document sheets S reach a separating unit, the documents S are separated into individual sheets by the separating roller 5 and the separating pad 4, so that the uppermost document S is separated from the others and conveyed. Further, by the conveying force from the pick-up roller 3 and the separating roller 5, the document sheet S thus separated is conveyed along the first document conveyance path 51 and the second document conveyance path 52 and then introduced into the third document conveyance path 53. At the third document conveyance path 53, the document sheet S is conveyed by the first conveying roller 7, which uses the driving motor as its drive source, to a reading unit including the CIS 30. The separating roller 5 is configured to rotate at a slower circumferential speed than the first conveying roller 7 and the second conveying roller 9. Thus, with the driving motor continuously rotated, the first document S and the second document S are spaced from each other by a predetermined amount of gap.

In the document reading conveying unit 1, upon detection of the leading edge of the document S by the document edge sensor (not illustrated) and the document S being conveyed by a predetermined amount from that position, the CIS 30 starts reading the image information on the surface of the document S with the document conveyed. Then, upon detection of the trailing edge of the document S by the document edge sensor (not illustrated) and the document S being conveyed by a predetermined amount from the position, the CIS 30 finishes reading the image information. If it is determined by the document edge sensor (not illustrated) that there is a following document S, the driving motor is kept rotating, so that the next document S is subsequently read. The document conveyance is continued and the image information on the next document S is read as above until a document presence/absence sensor (not illustrated) detects that there is no more next document. Each document sheet S read by the CIS 30 is guided by a sheet discharge guide (not illustrated) provided to the document loading pressing plate unit 40 and discharged onto the document discharge tray 18 by the second conveying roller 9.

On the other hand, consider a condition where the document reading conveying unit 1 is in the second conveyance mode, which is illustrated in FIG. 4B. In this condition, by rotation of the driving motor, the separating roller 5 and the pick-up roller 3 are rotated and, at the same time, the pick-up arm (not illustrated) is rotated to press the pick-up roller 3 against documents S, as in the first conveyance mode. By the rotation of the pick-up roller 3, the document sheets S are conveyed downstream in the conveyance direction. After the document sheets S reach the separating unit, the documents S are separated into individual sheets by the separating roller 5 and the separating pad 4, so that the uppermost document S is separated from the others and conveyed. Further, by the conveying force from the pick-up roller 3 and the separating roller 5, the document sheet S thus separated is introduced from the first document conveyance path 51 into the third document conveyance path 53, unlike the first conveyance mode. Thereafter, at the third document conveyance path 53, the document S is read as in the first conveyance mode.

Figure 5:
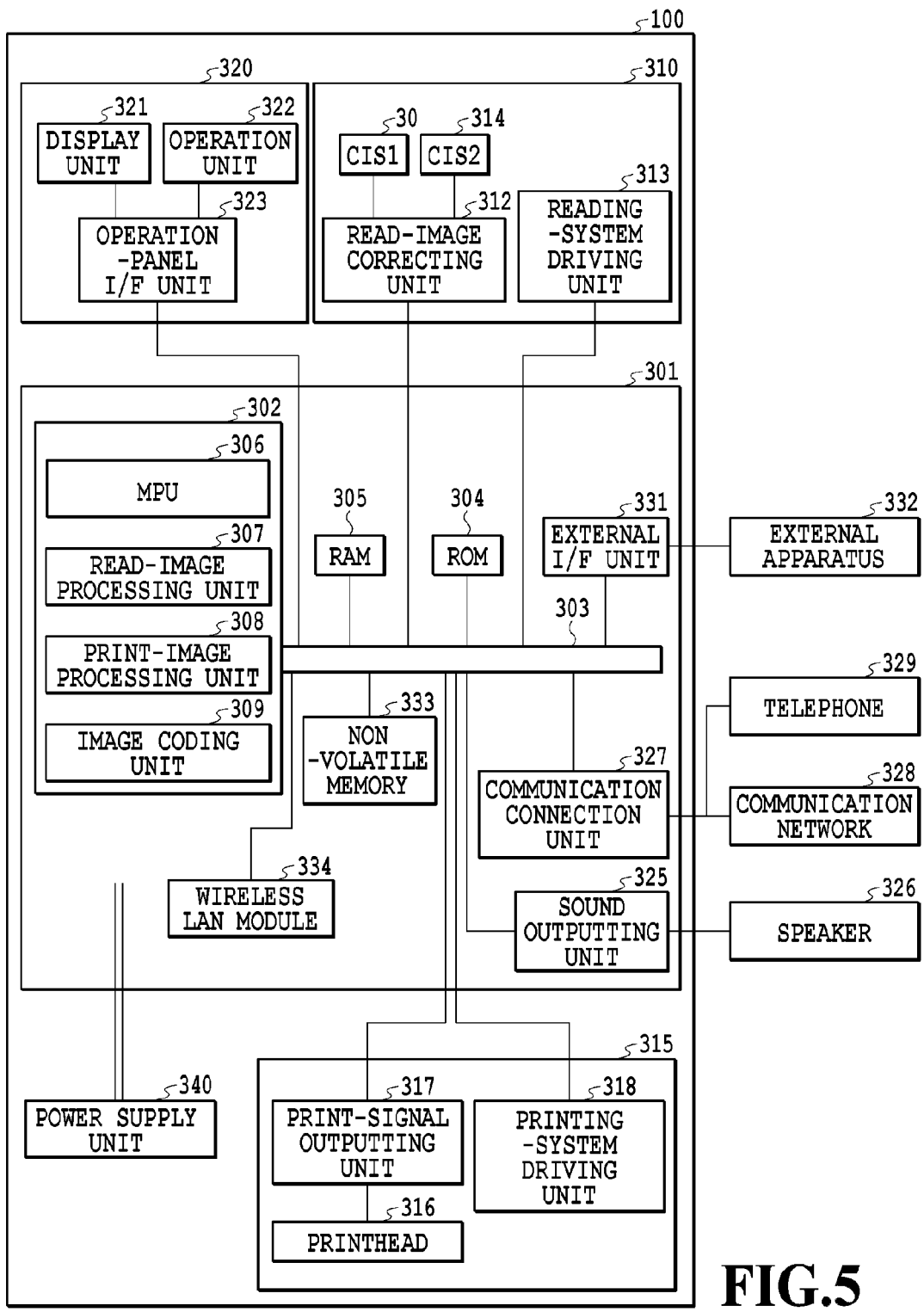
FIG. 5 is a block diagram illustrating the control configuration of the multi-function printing apparatus in the first embodiment.

FIG. 5 is a block diagram illustrating the control configuration of the multi-function printing apparatus 100 in this embodiment with the above-described configuration. In FIG. 5, a main control board 301 includes a main control IC 302 configured to control the whole apparatus. This main control IC 302 includes elements such as a microprocessor unit (MPU) 306, a read-image processing unit 307, a print-image processing unit 308, and an image coding unit 309 and controls the whole apparatus through a system bus 303. A ROM 304 stores program codes, default-value data, table data, and the like for operation of the MPU 306. A RAM 305 is used as a calculation buffer, an image memory, and the like. A reading unit 310 includes elements such as the above-mentioned CIS 30, a read-image correcting unit 312, a reading-system driving unit 313, and a CIS 314 in addition to the CIS 30. The reading unit 310 drives the reading-system driving unit 313 to move the CIS 30, so that an image is optically read piece by piece and converted into electric image signals. The read-image correcting unit 312 performs shading correction or the like on these signals. Further, the read-image processing unit 307 performs image processing and outputs high-resolution image data. The CIS 314 is operated simultaneously with the CIS 30 in a case of reading both sides of a document S. As mentioned above, the printing unit 315 moves a print head 316 to a predetermined position by using drive from the printing-system driving unit 318. Simultaneously, image data generated by the print-image processing unit 308 is outputted to the print head 316 through a print-signal outputting unit 317. Consequently, an image is printed. The operation panel 320 displays images and the like on a display unit 321 through an operation-panel interface unit 323 and receives operation inputs from an operation unit 322. A sound outputting unit 325 converts sound data into signals and outputs a message sound from a speaker 326. A communication connection unit 327 is connected to a communication network 328 and a telephone 329 and receives and transmits sound and coded data. The image coding unit 309 converts the coded data into an image and vice versa. An external interface unit 331 is, for example, a USB interface and is connected to an external apparatus 332 such as a personal computer. A non-volatile memory 333 is a flash memory or the like and stores work data and image data such that they will not be erased in the event of a power failure or the like. A wireless LAN module 334 receives and transmits images through an access point outside the apparatus. A power supply unit 340 supplies power necessary for the operation of elements such as the main control board 301, the reading unit 310, the printing unit 315, and the operation panel 320.

Description will now be given of a PC scanning operation, a copying operation, facsimile transmitting and receiving operations, and a printing operation performed by the multi-function printing apparatus 100 with the above-described configuration.

<PC Scanning Operation>

Image information on a document read by the CIS 30 (and the CIS 314) of the reading unit 310 is firstly subjected to a process such as shading correction by the read-image correcting unit 312. The image information is then developed as image data in the RAM 305 by the read-image processing unit 307, and thereafter subjected to compression coding into, for example, a JPEG format by the image coding unit 309. The coded data is outputted to the external apparatus 332 through the external interface unit 331.

<Copying Operation>

Image information on a document read by the CIS 30 (and the CIS 314) of the reading unit 310 is subjected to a process such as shading correction by the read-image correcting unit 312. The image information is then developed as image data in the RAM 305 by the read-image processing unit 307, thereafter subjected to compression coding into, for example, a JPEG format by the image coding unit 309, and temporarily stored. The stored image data is sent piece by piece to the print-image processing unit 308 and converted into a print image. The print image is outputted to the print head 316 through the print-signal outputting unit 317. Consequently, the print image is printed onto a sheet.

<Facsimile Transmitting Operation>

Image information on a document read by the CIS 30 (and the CIS 314) of the reading unit 310 is subjected to a process such as shading correction by the read-image correcting unit 312. The image information is then developed as image data in the RAM 305 by the read-image processing unit 307, thereafter subjected to compression coding into, for example, a Modified Read (MR) format by the image coding unit 309, and temporarily accumulated. As for the accumulated image data, the communication connection unit 327 transmits and receives procedure signals for facsimile communication, and then starts to transmit the image data. Even after the start of the transmission, the reading operation is continued, so that the transmission of image data is continued in parallel with accumulation of image data.

<Facsimile Receiving Operation>

Upon receipt of an incoming signal from the communication network 328, the communication connection unit 327 transmits and receives procedure signals for facsimile communication, and then starts to receive image data. The image data is demodulated and developed in the RAM 305 by the image coding unit 309. The developed image data is sent piece by piece to the print-image processing unit 308 and converted into a print image. The print image is outputted to the print head 316 through the print-signal outputting unit 317. Consequently, the print image is printed onto a sheet.

<Printing Operation>

A command and received parameters transmitted by the external apparatus 332 and received by the external interface unit 331 are interpreted by the MPU 306 and developed as image data in the RAM 305 by the image coding unit 309. The developed image data is sent piece by piece to the print-image processing unit 308 and converted into a print image. The print image is outputted to the print head 316 through the print-signal outputting unit 317. Consequently, the print image is printed onto a sheet.

The operation of switching the sheet conveyance path and the mechanism therefor will now be described in detail.

Figure 6A:
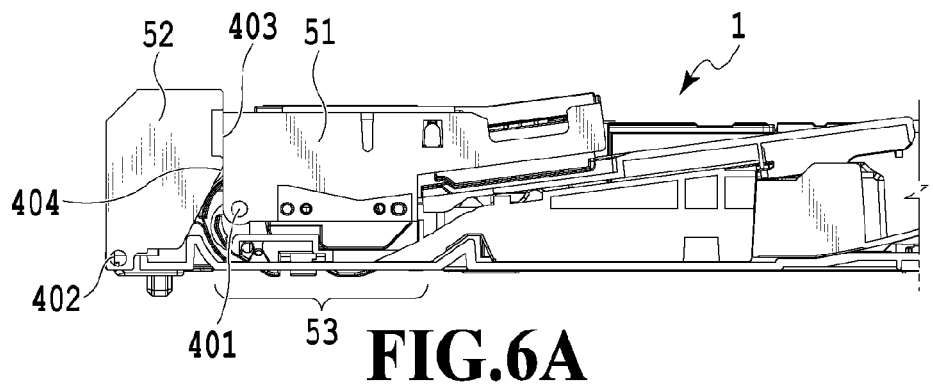
FIG. 6A to FIG. 6C are views explaining an operation of switching a sheet conveyance path and a mechanism therefor according to the first embodiment.
Figure 6B:
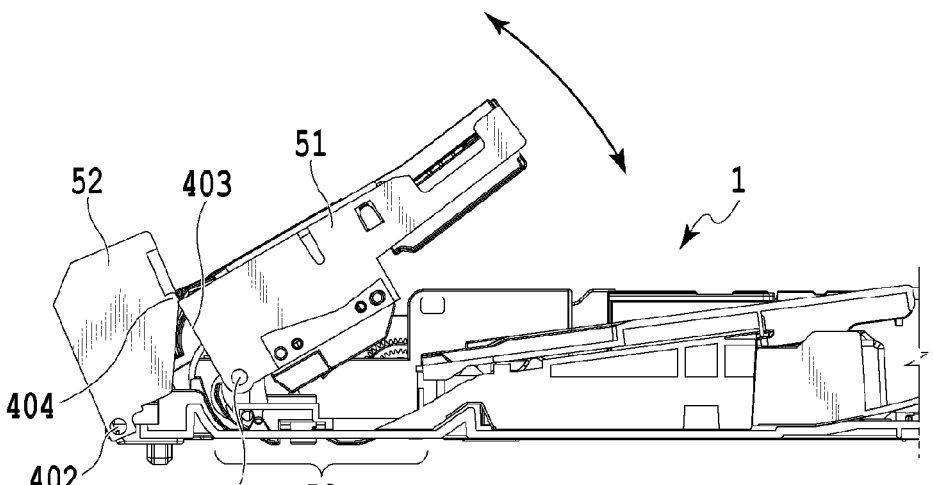
Figure 6C:
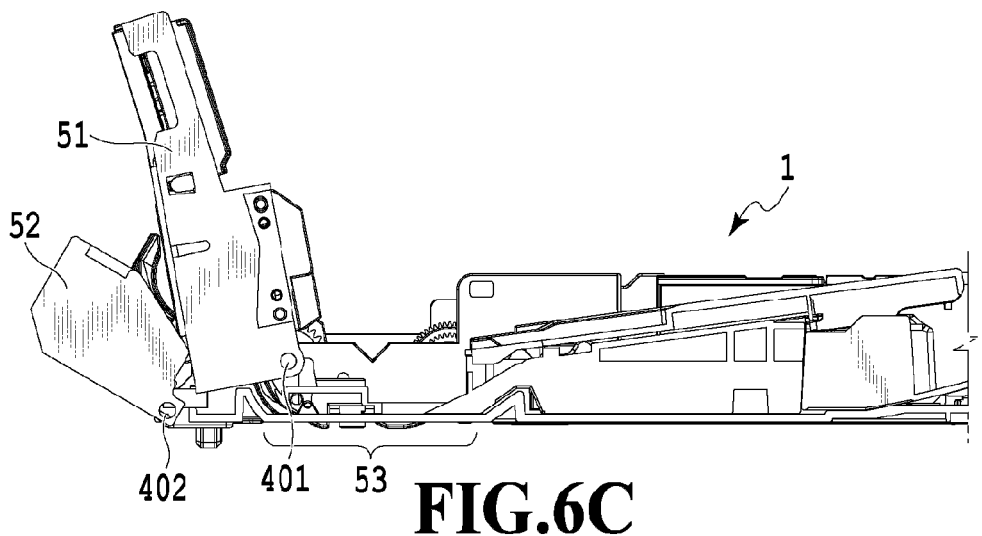

FIG. 6A to FIG. 6C are views explaining the operation of switching the sheet conveyance path and the mechanism therefor according to the first embodiment of the present invention.

As mentioned above, the first document conveyance path 51 is supported to be rotatable about a first document-conveyance-path rotation shaft 401. Also, the second document conveyance path 52 is supported to be rotatable about a second document-conveyance-path rotation shaft 402. Moreover, the second document conveyance path 52 is biased toward the first document conveyance path 51 by a torsion coiled spring (not illustrated) provided to the second document-conveyance-path rotation shaft 402. It is to be noted that in this specification, the first document conveyance path 51 and the second document conveyance path 52 are literally referred to as conveyance paths but each of these conveyance paths is also referred to as a single unit that rotates as explained in FIG. 6A to FIG. 6C. Meanwhile, the first conveyance mode may represent such a position that the angle of rotation with respect to the discharge tray is a predetermined angle. Also, the second conveyance mode may represent such a position that the angle of rotation is greater than the above predetermined angle.

The first document conveyance path 51 and the second document conveyance path 52 are both formed in comb-tooth shapes at the boundary therebetween formed while the first document conveyance path 51 and the second document conveyance path 52 are in the first conveyance mode, illustrated in FIG. 6A. This prevents a document from, for example, being caught in a case where the conveyance path is switched. Also, the first document conveyance path 51 is provided with a first-document-conveyance-path rotation cam 403, and the second document conveyance path 52 is provided with a second-document-conveyance-path rotation cam 404. The first document conveyance path 51 and the second document conveyance path 52 abut each other through these cams, and are rotated to each of the positions illustrated in FIG. 6A to FIG. 6C through mutual camming actions.

Specifically, as mentioned above, the second document conveyance path 52 is biased toward the first document conveyance path 51 by a coiled spring. In this state, the user manually rotates the first document conveyance path 51 counterclockwise from the first conveyance mode, illustrated in FIG. 6A, for example. As a result, the rotation causes the first-document-conveyance-path rotation cam 403 and the second-document-conveyance-path rotation cam 404 to act on each other, so that the second document conveyance path 52 is rotated counterclockwise along with the first document conveyance path 51, as illustrated in FIG. 6B. In this embodiment, in a case where the first document conveyance path 51 is rotated 100 degrees, it hits a rotation stopper and is fixed at that position by a fixing mechanism (not illustrated). This state is the second conveyance mode, illustrated in FIG. 6C. The opposite, clockwise rotation is similar; from the state illustrated in FIG. 6C, the user manually rotates the first document conveyance path 51 clockwise. By doing so, the first document conveyance path 51 can shift sequentially to the state illustrated in FIG. 6B and to the state illustrated in FIG. 6A.

In the first conveyance mode, illustrated in FIG. 6A, the conveyance path from the feed to the discharge of a sheet is a U-turn conveyance path (U-turn path) along which a sheet is conveyed with the conveyance direction turning approximately 180 degrees. This reduces the actual area used by the apparatus including documents to be fed and discharged documents. On the other hand, in the second conveyance mode, the sheet conveyance direction is more straight (straight path) than the U-turn conveyance, thereby making larger the actual area used by the apparatus. However, conveyed sheets are less likely to be curled, and the conveyance resistance is smaller. Hence, the second conveyance mode can handle a wider range of sheets such as thick sheets. According to this embodiment, the conveyance mode can be switched between the first conveyance mode and the second conveyance mode by the above-mentioned actions. Thus, the user can choose to place priority on the actually used area or to place priority on the types of sheets that can be used.

In the action of changing from the first conveyance mode to the second conveyance mode, the first document conveyance path 51 and the second document conveyance path 52 do not interfere with each other. Thus, a conveyance path extending in a width direction perpendicular to the conveyance direction can be formed within the entire range. This reduces conveyance failures caused by a document being caught and the like. Specifically, the first document conveyance path 51, which is a movable conveyance path, forms conveyance paths at two rotational positions (two postures of the conveying unit) in the first conveyance mode (FIG. 6A) and the second conveyance mode (FIG. 6C). In this case, in the first conveyance mode, the first document conveyance path 51 forms a conveyance path in abutment with the second document conveyance path 52, and the second document conveyance path 52 forms a conveyance path in abutment with the third document conveyance path 53. On the other hand, in the second conveyance mode, the first document conveyance path 51 forms a conveyance path in abutment with the third document conveyance path 53, but the second document conveyance path 52 does not form a conveyance path. Thus, the first document conveyance path 51 moves in such a way as to be simply separated from the third document conveyance path 53 in a case where the first document conveyance path 51 is rotated toward the position of the first conveyance mode from the rotational position forming the second conveyance mode with the third document conveyance path 53. On the other hand, in a case where the first document conveyance path 51 is rotated in the opposite direction to the position forming the second conveyance mode, the first document conveyance path 51 moves in such a way as to simply come into abutment with the third document conveyance path 53. Thus, a conveyance path configuration is achieved in which no portion of the first document conveyance path 51 interferes with the third document conveyance path 53 in the case where the first document conveyance path 51 is rotated. Also, in this rotation, the first document conveyance path 51 similarly rotates the second document conveyance path 52 through their cams. Thus, interference between the conveyance paths is avoided in this rotation.

Further, in the second conveyance mode, the length of the conveyance path between the separating roller 5 and the first conveying roller 7 is shorter than that in the first conveyance mode. Thus, the second conveyance mode can handle documents shorter in length in the conveyance direction than the first conveyance mode can. Further, the second conveyance mode can contribute to reduction of the conveyance time. Moreover, since the first document conveyance path 51 and the second document conveyance path 52 abut each other only at their cam portions, rotational actions do not at all affect the sheet passage surface of the conveyance path. Thus, the sheet passage surface is always maintained in a good condition.

Figure 7A:
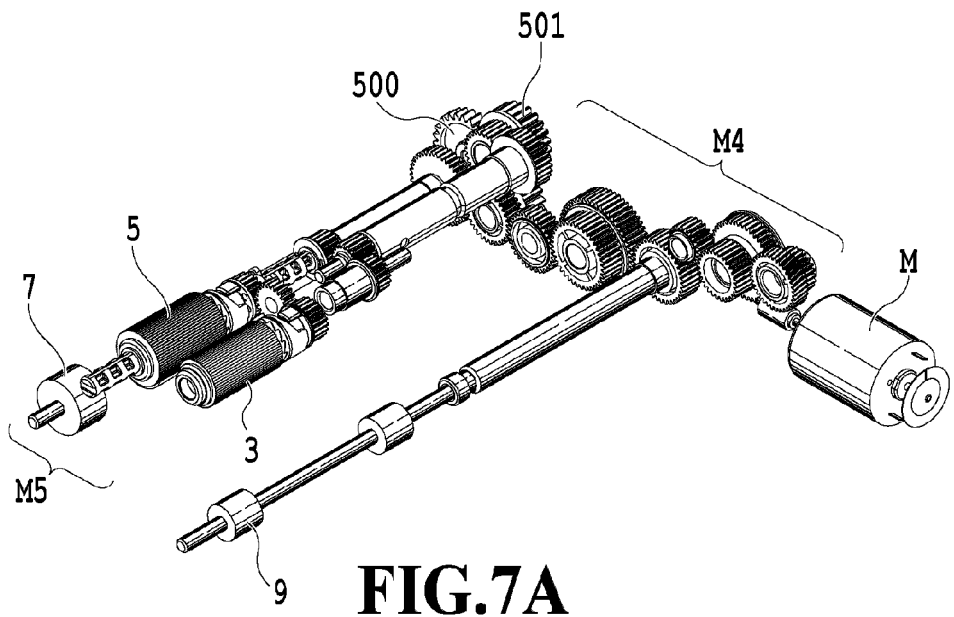
FIG. 7A and FIG. 7B are views explaining a driving mechanism configured to drive conveying rollers and the like in the first embodiment.
Figure 7B:
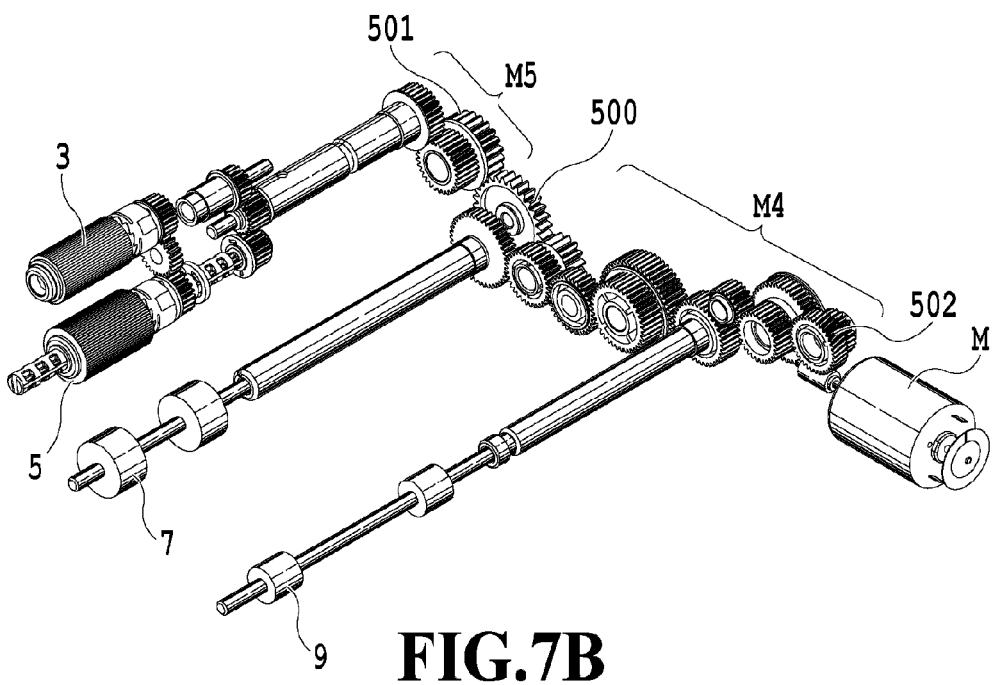

FIG. 7A and FIG. 7B are views explaining a driving mechanism configured to drive the conveying rollers and the like in the document reading conveying unit 1 according to the first embodiment of the present invention.

As illustrated better in FIG. 7B, a gear train constituting the driving mechanism in this embodiment includes two gear trains of a gear train M4 and a gear train M5. Among these, the gear train M5 is provided inside the unit of the first document conveyance path 51. The rotation shafts of the pick-up roller 3 and the separating roller 5 are connected to one of the gears of the gear train M5. On the other hand, the gear train M4 is provided inside the document loading pressing plate unit 40. The rotation shafts of the first conveying roller 7 and the second conveying roller 9 are connected to some of the gears of the gear train M4. These first and second conveying rollers 7 and 9 constitute the third document conveyance path 53. FIG. 7A corresponds to the first conveyance mode, illustrated in FIG. 6A, and FIG. 7B corresponds to the second conveyance mode, illustrated in FIG. 6B.

A pinion gear mounted to the rotation shaft of a driving motor M is engaged with a gear 502 at an end of the gear train M4. Thus, driving force from the driving motor M is transmitted to the above-mentioned rollers through the gears of the gear train M4, an intermediate gear 500, and the gears of the gear train M5. The driving motor M is a brushed DC motor. Near this motor, a rotary encoder is arranged which is configured to detect the amount of rotation by reading, with an encoder sensor (not illustrated), detection slit patterns printed on a cord wheel film (not illustrated) which is arranged on the motor's shaft. The rotation of the driving motor M is controlled through pulse width modulation (PWM) based on pulse signals from the encoder.

Between the gear train M4 and the gear train M5, the intermediate gear 500 is disposed, which is configured to transmit the rotations of these gear trains. This intermediate gear 500 is rotatably supported with its rotation shaft lying on the same axis as the axis of the above-mentioned rotation shaft 401 (rotational center) of the first document conveyance path 51. Thus, in the case where the first document conveyance path 51, described above with reference to FIG. 6A to FIG. 6C, is rotated, the entire gear train M5 is rotated along with the first document conveyance path 51 with the intermediate gear 500 stopped. Specifically, a gear 501 at an end of the gear train M5, which is disposed inside the first document conveyance path 51, turns as a planetary gear around the intermediate gear 500 as a sun gear. The gear of the gear train M5 other than the gear 501 is rotated according to the rotation of the gear 501 resulting from its turning motion. The driving mechanism configured as above simplifies the configuration of the driving mechanism for the configuration for switching the conveyance path through rotation of the first document conveyance path 51.

Note that while the driving motor M is driven to rotate the rollers, the intermediate gear 500 rotates to transmit the rotation of the gears of the gear train M4 to the gears of the gear train M5, as a matter of course.

Also, in this embodiment, while the driving motor M is rotationally driven in the direction for conveying a document sheet, the intermediate gear 500 rotates in the direction of rotation of the first document conveyance path 51 from the first conveyance mode toward the second conveyance mode. Hence, in the case of conveying a document sheet in the second conveyance mode, driving force is applied to the first document conveyance path 51 in such a direction as to open it. This prevents the first document conveyance path 51 from closing.

Also, the intermediate gear 500 rotates the gear train M5, which is downstream of the intermediate gear 500, in response to the user's operation to shift the first document conveyance path 51 from the first conveyance mode toward the second conveyance mode. Here, the gear train M5 is configured such that the separating roller 5 and the pick-up roller 3 rotate with this rotation in the direction opposite to their document-sheet conveyance direction. Hence, in a case where a document sheet is jammed while being conveyed in the first conveyance mode, the document sheet does not receive any force in the conveyance direction even if the user moves the first document conveyance path 51 to the second rotational position. Thus, the jammed document sheet can be easily removed.

Figure 8A:
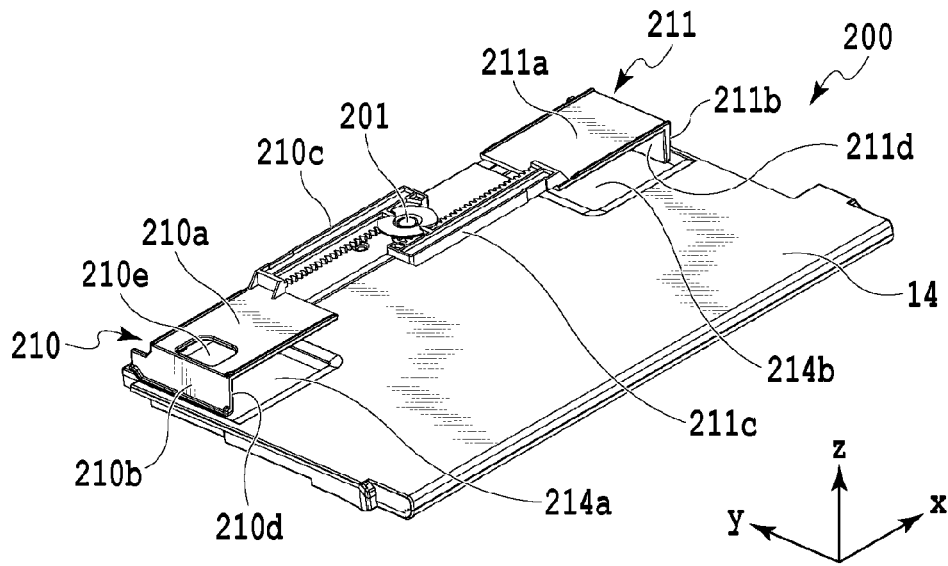
FIG. 8A and FIG. 8B are perspective views illustrating the configuration of a side guide unit of a placement tray in the document reading conveying unit in the first embodiment.
Figure 8B:
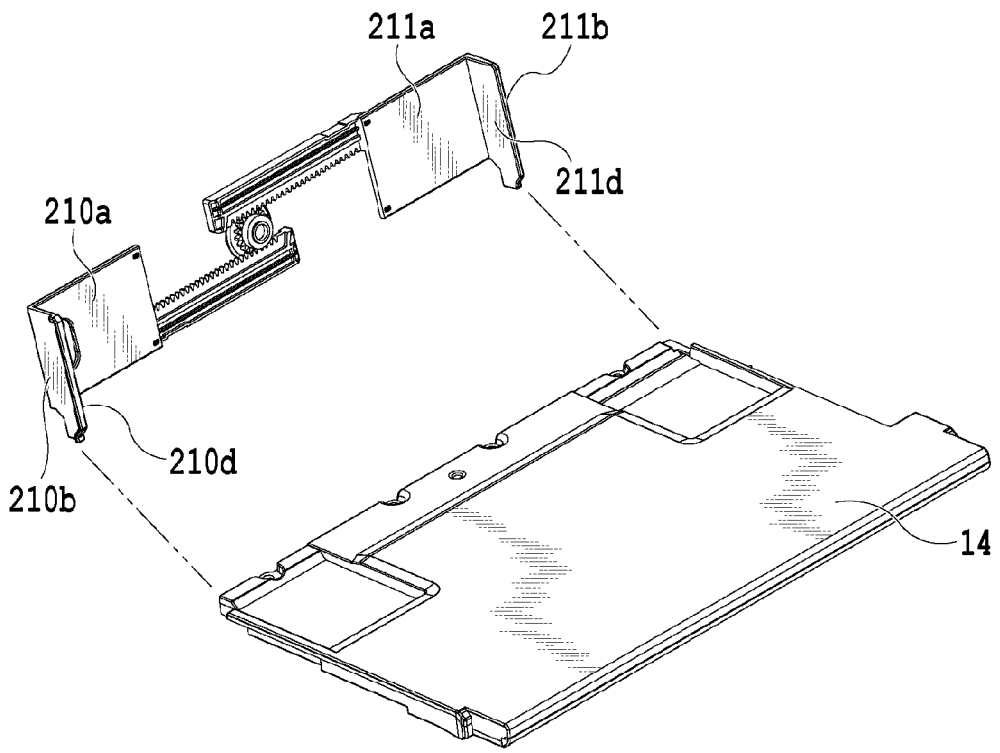

FIG. 8A and FIG. 8B are perspective views illustrating the configuration of a side guide unit of a placement tray 14 in the document reading conveying unit 1 according to the first embodiment of the present invention. FIG. 8B is a view illustrating the unit detached. Description will now be given of the configuration of the side guide unit, which is configured to guide the widthwise edges of a document sheet in the conveyance direction on the placement tray 14, with reference to FIG. 8A and FIG. 8B as well as FIG. 2A and FIG. 2B.

A side guide unit 200 is provided to the first document conveyance path 51. The side guide unit 200 includes a pair of guiding members 210 and 211 configured to guide a document sheet in the conveyance direction by coming into abutment with the widthwise edges of the document, respectively. The guiding members 210 and 211 integrally include rack parts 210c and 211c, respectively. These rack parts are each arranged to mesh with a pinion gear 201 arranged at the center of the first document conveyance path 51 in the width direction. Specifically, each rack part is joined to a side guide base. Also, the guiding members 210 and 211 are each configured to be slidable in the document-sheet width direction (direction perpendicular to the conveyance direction). Thus, the guiding members 210 and 211 of the side guide unit 200 can move relative to a center line extending in the document conveyance direction. The guiding members 210 and 211 include side guide bases 210a and 211a configured to face the document surface of a sheet, and restricting parts 210b and 211b configured to guide a document sheet in the conveyance direction by abutting the side edges of the document sheet, respectively. These restricting parts include flat portions 210d and 211d, respectively, which are parallel to the conveyance direction and perpendicular to the document surface. The side guide bases 210a and 211a hold their respective restricting parts such that the restricting parts extend downward. A document feed guide 203 illustrated in FIG. 2B is provided on the opposite side to the document placement tray 14 in the first conveyance mode. Specifically, an upper cover 101 of the first document conveyance path 51 and the document feed guide 203 are arranged with the side guide unit 200 interposed therebetween. The upper cover 101 of the first document conveyance path 51 includes an opening 204, and the side guide base 210a of the side guide unit 200 is exposed through this opening. A hole 210e is provided in the side guide base 210a. The hole 210e is formed to be situated at a position coinciding with the opening 204.

The hole 210e, provided in the side guide base 210a, functions as an operation portion on which the user places his or her finger to slide the side guide unit 200. Specifically, the user places his or her finger on this hole 210e and moves the side guide base 210a in such a way as to slide it. In this way, the position of the operation portion can be substantially the same in the z direction as the positions of the centers of gravity of the members that are configured to move for the sliding operation such as the side guide base and the rack part. This prevents the guiding member from being rotated by the sliding operation. Consequently, the side guide will not, for example, be stuck during the sliding operation, allowing a smooth moving operation of the side guide.

Note that as the operation portion to place the user's finger, a recess that does not penetrate through the plate surface of the side guide base may be provided instead of the hole 210e, which penetrates through the plate surface. Alternatively, a projection projecting from the side of the side guide base opposite to its sheet passage surface, i.e.,. the upper surface of the side guide base, may be provided as a portion to place the user's finger.

In the first conveyance mode, illustrated in FIG. 2A, the user can place his or her finger on the edge of the hole 210e, which is exposed through the opening 204 in the upper cover 101 of the first document conveyance path 51, and slide the side guide unit 200. In this sliding operation, the guiding members 210 and 211 are situated above document sheets placed on the document placement tray 14, and the restricting parts 210b and 211b extend downward from above the document sheets. Recesses 214a and 214b are formed in the document placement tray. The restricting parts 210b and 211b are formed such that their height is greater than the height of the entrance at the document placement unit, and are configured such that the tips of the restricting parts 210b and 211b enter the recesses 214a and 214b. The recesses 214a and 214b are provided according to the range of motion of the side guide unit 200. Specifically, the recesses are formed according to the range from the largest to the smallest document-sheet widths that can be handled. Entering the recesses 214a and 214b, the tips of the restricting parts 210b and 211b are situated below the document setting surface of the tray. In this way, documents will not get under the restricting parts when the documents are set. By providing the side-guide sliding mechanism (the rack and pinion unit; moving mechanism) to the upper cover 101 side of the first document conveyance path 51 above document sheets, no guide hole shape is needed on the document placement tray 14 side for guiding the side guide. Generally, the user sets a document sheet set on the document placement tray 14 by shifting and pushing the document in the sheet feed direction to a setting position. In this operation, the leading edge of the document might be caught on a guide hole in the side guide. If the user continues setting the document, a trouble such as damaging the document sheet will possibly occur. In contrast, in this embodiment, the document setting surface of the document placement tray 14 does not have any hole shape that would obstruct the setting of a document, as mentioned above. Consequently, a document sheet can be smoothly set. The presence of no hole shape also offers the advantage that foreign matters are prevented from entering the document conveying apparatus. Meanwhile, the pick-up roller 3 and the separating roller 5 are also provided in the first-conveyance-path cover 101, which forms the first conveyance path 51. Since the side guide unit 200 and the pick-up roller 3 and the separating roller 5, which form a sheet feeding unit, are mounted in the same conveyance path member, their mount positions can be accurately arranged relative to each other. This prevents a situation where the pick-up roller is not placed precisely at the center of a document, thereby unbalancing the document in the left-right direction when the document is pulled in and making the document skew, which deteriorates straight conveyance performance.

In the second conveyance mode, the document feed guide 203 functions as a supporting surface configured to support the underside of a document, as illustrated in FIG. 2B. The user can grip the tip of the restricting part 210b of the side guide unit 200 and slide the side guide in its movement direction. In this second conveyance mode too, skewing is prevented since the side guide unit 200 and the pick-up roller 3 and the separating roller 5, which form the sheet feeding unit, are mounted in the same member.

As described above, the configuration of the side guide unit in this embodiment is a configuration with paired side guides but can still achieve good operability. Further, since the positional accuracy of the side guides and the separating unit relative to each other in the width direction is maintained high, sheet separation performance such as prevention of skewing is improved. Furthermore, even in a sheet conveying apparatus capable of switching the conveyance path, the side guide unit in this embodiment can restrict the position of a sheet in the direction perpendicular to the conveyance direction in the same manner in the plurality of conveyance modes. This makes it possible to configure side guides capable of guiding a document in a preferred manner and having good operability regardless of which mode the conveyance path is in. Meanwhile, in the first conveyance mode, the guide bases cover a sheet on the tray from above in a non-contacting manner and, in the second conveyance mode, the guide bases serve as part of the sheet placement unit.

FIG. 9A and FIG. 9C are views explaining indicators on the placement tray 14 according to the first embodiment of the present invention which the user refers to in a document setting operation. FIG. 9A and FIG. 9C illustrate the document placement unit in the first conveyance mode and the second conveyance mode, respectively. FIGS. 9B and 9D illustrate enlarged view of IXB portion in FIG. 9A and IXD portion in FIG. 9C, respectively.

As illustrated in FIG. 9A, the upper cover 101 as a member covering the upper side of the first document conveyance path 51 is provided with a conveyance-path upper-cover indicator 102 including an indicator indicating the front side of a sheet document (front side up) and an arrow indicator (direction indicator) indicating the direction toward the downstream side in the direction of conveyance of this document. These indicators are for the first conveyance mode. Also, these indicators are formed by indented portions. Further, as illustrated in FIG. 9C, a lower cover 103 as a member covering the lower side of the first document conveyance path 51 is provided with a conveyance-path lower-cover indicator 104 including an indicator indicating the back side of a document sheet (back side up) and an arrow indicator indicating the direction toward the downstream side in the direction of conveyance of the document sheet. These indicators are for the second conveyance mode. These indicators are formed by indented portions as well.

In the first conveyance mode, illustrated in FIG. 9A, following the conveyance-path upper-cover indicator 102 on the upper cover 101, the user places document sheets such that their front sides face upward and the front side of the uppermost sheet (first page) can be seen. In doing so, the user inserts the document sheets into the first document conveyance path 51 in the direction of arrow A in the figure and places them on the placement tray 14. When inserting the sheets and placing them on the placement tray 14, the user can perform the placing operation looking at an indicator 102A of the upper-cover indicator 102 indicating the front side of a sheet. In this way, the user can compare the sheet surface and the indicator 102A, indicating a front side, in the placing operation; then if, for example, not seeing the side of a placed sheet on which document information is described, the user can notice that the front and back sides of the sheets are oriented in the opposite way.

Note that during this placing operation in the first conveyance mode, the conveyance-path lower cover 103 is held inside, so that the user cannot see the conveyance-path lower-cover indicator 104. After reading a document in this state, the document sheet is passed between the conveyance-path lower cover 103 and a cover facing the conveyance-path lower cover 103. Then, the first document page is discharged onto the document discharge tray 18 with its front side in contact with the surface of the document discharge tray 18. Subsequent sheets are then discharged one by one, and the last page is discharged with its back side up.

In the second conveyance mode, illustrated in FIG. 9C, the conveyance-path lower cover 103 is visible; thus, following the conveyance-path lower-cover indicator 104 on this cover, the user places document sheets such that the back side of the lowermost sheet (last page) can be seen. The user inserts the document sheets into the first document conveyance path 51 in the direction of arrow B in the figure and places them. Similarly to the above, when inserting the sheets and placing them on the placement unit, the user can perform the placing operation looking at an indicator 104A of the lower-cover indicator 104 indicating the back side of a sheet. In this way, the user can compare the sheet surface and the indicator 104A, indicating a back side, in the placing operation; then if the front and back sides of the sheets are oriented in the opposite way, the user can notice that misplacement.

Note that during this placing operation in the second conveyance mode, the conveyance-path upper cover 101 is situated on the back of the part on which the sheets are placed, so that the user cannot see the conveyance-path upper-cover indicator 102. In reading documents in this state, the first document page is discharged onto the document discharge tray 18 with its front side in contact with the surface of the document discharge tray 18. Subsequent pages are then discharged one by one, and the last page is discharged with its back side up.

As described above, according to this embodiment, when placing a sheet onto the placement unit, the user can place the sheet checking whether its front and back sides are oriented correctly. This prevents a situation where the user does not notice that the front and back sides have been oriented in the opposite way until obtaining the result of reading the document. Hence, the operability of the apparatus is improved.

An apparatus described in, for example, Japanese Patent Laid-Open No. 2014-094801 is configured such that indicators are hidden by a document sheet in a state where the sheet is set (placed). For this reason, once a sheet is set, the user cannot check whether its front and back sides are oriented correctly. This might lead to a situation where the user does not notice that the front and back sides have been oriented in the opposite way until obtaining the result of reading the document.

In this embodiment, a sheet conveying apparatus can be provided which allows the user to check without fail whether the front and back sides of a document sheet are oriented correctly when placing the document sheet on a placement unit.

Also, the user can individually see the first-document-conveyance-path upper-cover indicator 102 and the conveyance-path lower-cover indicator 104 during an operation in the first conveyance mode and an operation in the second conveyance mode, respectively. In other words, the user never sees both indicators at the same time during a document-sheet placing operation in either of the conveyance modes. Thus, the user can clearly recognize the orientation of the front and back sides of the document and the direction of insertion thereof. Further, in this embodiment, the indicators 102A and 104A of the conveyance-path upper-cover indicator 102 and the conveyance-path lower-cover indicator 104 are opposite to each other—one represents a front side and the other represents a back side. This allows easier recognition.

Also, according to this embodiment, a sheet conveying apparatus is obtained which includes a conveying unit capable of changing its posture through rotation and forms a sheet conveyance path capable of conveying a sheet without fail regardless of which posture the conveying unit is in.

(Second Embodiment)

Figure 10A:
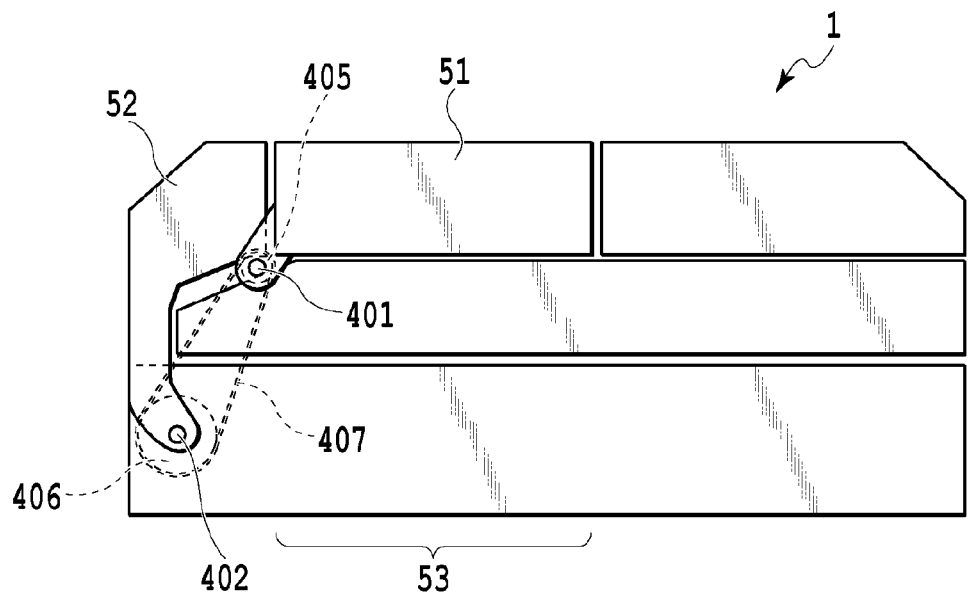
FIG. 10A and FIG. 10B are views explaining an operation of switching a sheet conveyance path and a mechanism therefor according to a second embodiment.
Figure 10B:
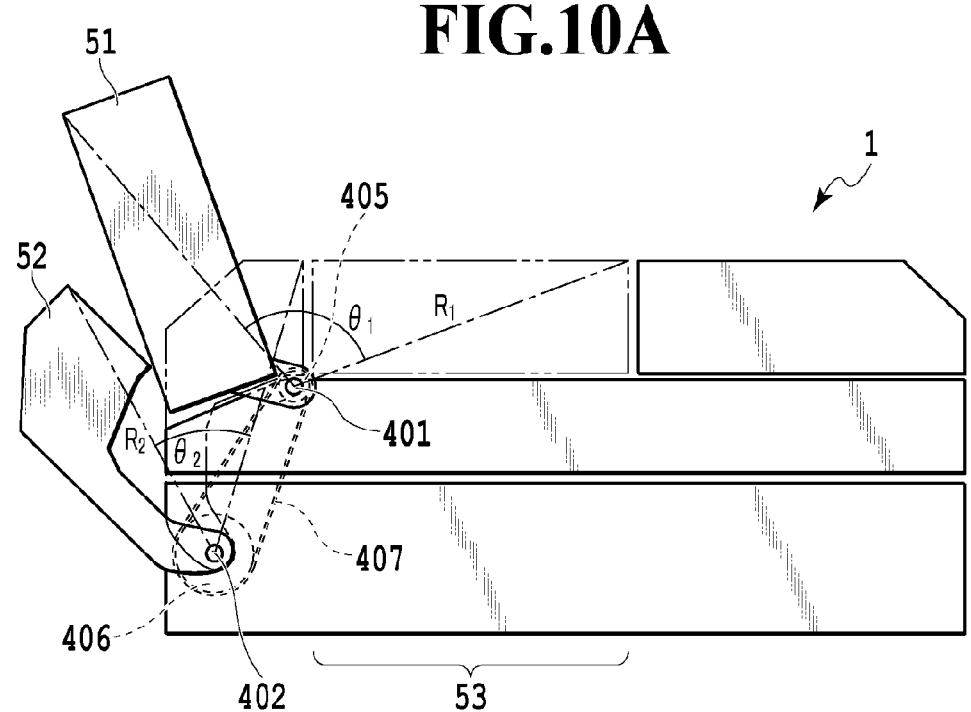

FIG. 10A and FIG. 10B are views schematically explaining an operation of switching a sheet conveyance path and a mechanism therefor according to a second embodiment of the present invention. This embodiment relates to a configuration that moves a second document conveyance path 52 in conjunction with rotation of a first document conveyance path 51 without using the cams mentioned above in the first embodiment.

As illustrated in FIG. 10A and FIG. 10B, the first document conveyance path 51 is supported to be rotatable about a first-document-conveyance-path rotational center 401, as mentioned in the first embodiment. In this embodiment, a first pulley 405 is rotatably mounted coaxially with this first-document-conveyance-path rotational center 401, and its rotation shaft is configured to rotate with rotation of the first document conveyance path 51. Similarly, the second document conveyance path 52 is supported to be rotatable about a second-document-conveyance-path rotational center 402. Moreover, a second pulley 406 is mounted coaxially with this second-document-conveyance-path rotational center 402, and its rotation shaft is configured to rotate with rotation of the second document conveyance path 52. A belt 407 is wound around the first pulley and the second pulley, thereby enabling transmission of rotation of one conveyance path to the other conveyance path.

Specifically, in a case where the user rotates the first document conveyance path 51 from a first conveyance mode illustrated in FIG. 10A toward a second conveyance mode illustrated in FIG. 10B, the first pulley 405 rotates with this rotation. This rotation is transmitted to the second pulley 406 through the belt 407 and rotates the second pulley 406. This rotation of the second pulley 406 rotates the second document conveyance path 52 in the same direction as the first document conveyance path 51. Rotation from the second conveyance mode toward the first conveyance mode is similar; in a case where the user rotates the first document conveyance path 51, the second document conveyance path 52 rotates in the same direction in conjunction with that rotation. In this rotation, given that the range of rotation of the first document conveyance path 51 is $\theta_1$, then the range of rotation of the second document conveyance path 52 is $\theta_2$, and the relation between $\theta_1$ and $\theta_2$ may be defined such that the first document conveyance path 51 and the second document conveyance path 52 do not abut each other. The relation is desirably such that the first document conveyance path 51 and the second document conveyance path 52 do not abut each other but are as close as possible to each other.

Meanwhile, the pulley 406 or the pulley 405 may be provided with a one-way clutch, for example. In this way, in a case where the first document conveyance path 51 is rotated clockwise (from the second conveyance mode toward the first conveyance mode), only the second document conveyance path 52 can be freely rotated counterclockwise. Consequently, in the event of, for example, a jam, the user can rotate only the second document conveyance path 52 counterclockwise and remove the jammed sheet.

As described above, according to this embodiment, as in the first embodiment, the first conveyance path does not interfere with the second conveyance path in the action of changing from the first conveyance mode to the second conveyance mode. Thus, a conveyance path extending in a width direction perpendicular to the conveyance direction can be formed within the entire range. Moreover, since the first document conveyance path 51 and the second document conveyance path 52 do not abut each other, the sheet passage surfaces of the conveyance paths are less likely to be damaged.

Note that the first conveyance path 51 and the second conveyance path 52 may be coupled to each other by using gears besides cams and belts or by using a combination of these as a mechanism that causes the first conveyance path 51 and the second conveyance path 52 to move in conjunction with each other.

(Third Embodiment)

Figure 11A:
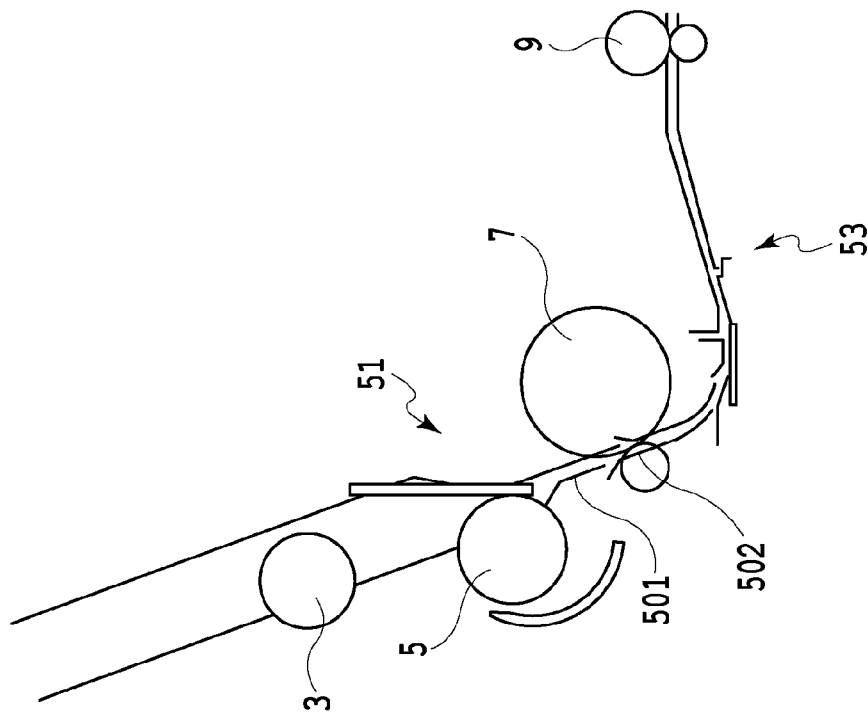
FIG. 11A and FIG. 11B are schematic cross-sectional views illustrating the configuration of a document reading conveying unit in a third embodiment.
Figure 11B:
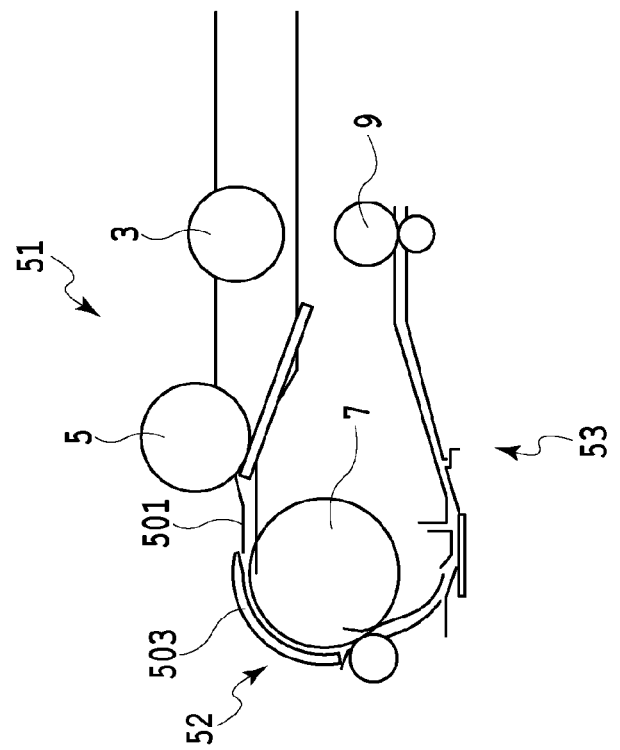

FIG. 11A and FIG. 11B are schematic cross-sectional views illustrating the configuration of a document reading conveying unit according to a third embodiment of the present invention, and illustrate a first conveyance mode and a second conveyance mode, respectively. As illustrated in FIG. 11A, an arch forming a third sheet passage surface 503 of a second document conveyance path 52 is substantially coaxial with a first conveying roller 7. Further, the third sheet passage surface 503 is arranged to abut a first sheet passage surface 501 of a first document conveyance path 51. Furthermore, the third sheet passage surface 503 is also arranged to abut a second sheet passage surface 502 of the first document conveyance path 51. With this conveyance path configuration, a rotation shaft 401 (see FIG. 6A to FIG. 6C) of the first document conveyance path 51 and the rotation shaft of the first conveying roller 7 can be the same shaft.

Figure 12A:
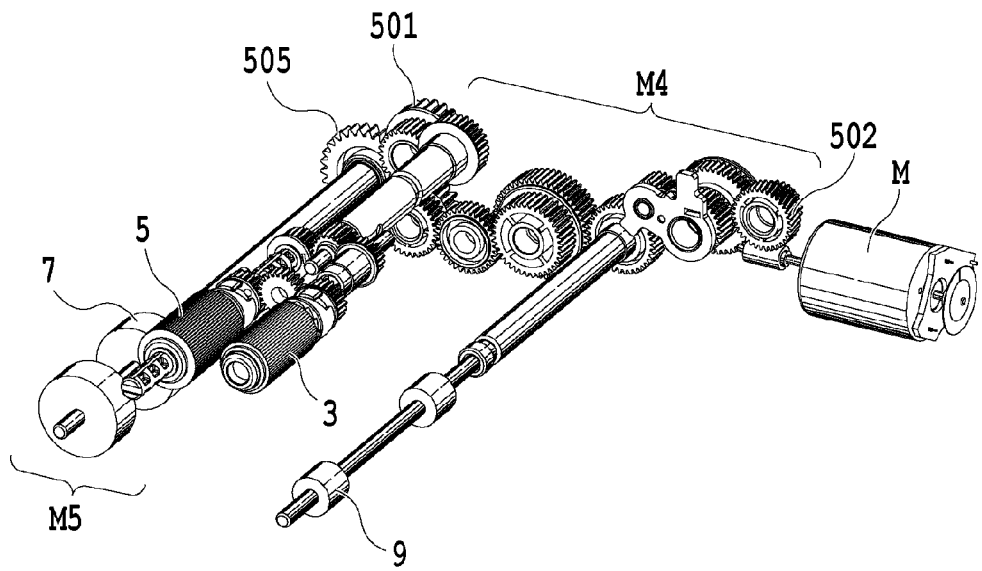
FIG. 12A and FIG. 12B are views illustrating a driving mechanism in the document reading conveying unit in the third embodiment.
Figure 12B:
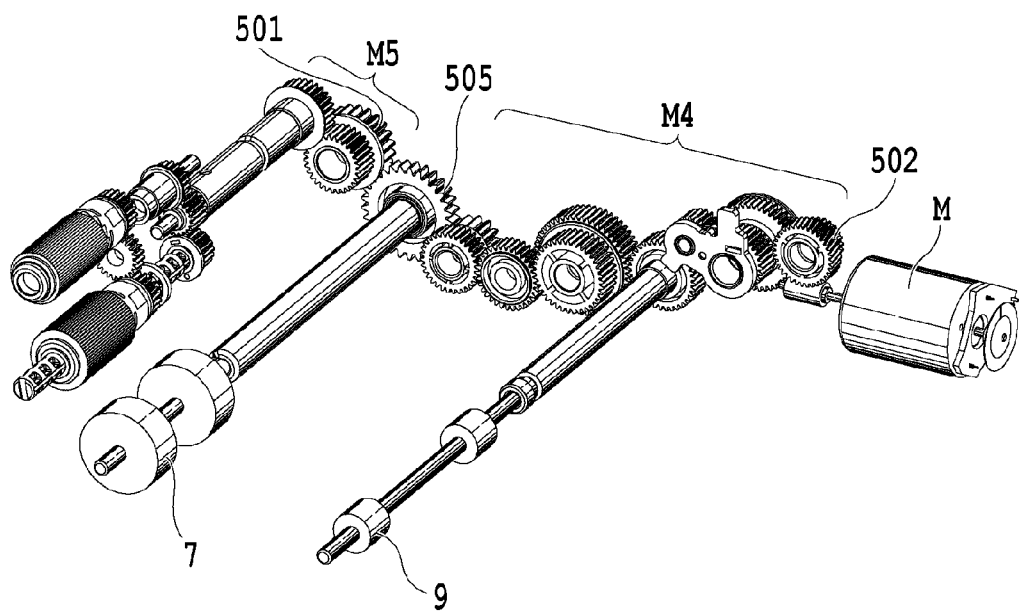

FIG. 12A and FIG. 12B are views illustrating a driving mechanism for the document reading conveying unit according to the third embodiment and are views similar to FIG. 7A and FIG. 7B. This embodiment differs from the first embodiment illustrated in FIG. 7A and FIG. 7B in that the first conveying roller 7 and an intermediate gear 505 are coaxial with each other, as mentioned above. In this way, the intermediate gear and the first-conveying-roller gear 505 can share a rotation shaft, thereby reducing the cost of the driving gear train.

As described above, according to this embodiment, a sheet conveying apparatus is obtained which includes a simple driving mechanism that, even if the posture of a conveying unit is changed, transmits driving force to rollers in the conveying unit through the same gear train.

(Fourth Embodiment)

A fourth embodiment of the present invention relates to a configuration that reads document information on a sheet with a reading sensor provided to a document reading conveying unit 1. FIG. 13A and FIG. 13E are views schematically illustrating cross sections of a document conveying reading unit in a first conveyance mode and a second conveyance mode, respectively, according to the fourth embodiment of the present invention. FIGS. 13B, 13C and 13D illustrate enlarged view of XIIIB portion, XIIIC portion and XIIID portion in FIG. 13A, respectively. FIGS. 13F, 13G and 13H illustrate enlarged view of XIIIF portion, XIIIG portion and XIIIH portion in FIG. 13E, respectively. Elements having similar functions to those in the above first embodiment are denoted by the same reference signs, and their description will be omitted.

In FIG. 13A and FIG. 13E, a CIS 150 is, for example, the same reading sensor as the CIS 30, which has been described above in the first embodiment, and is arranged above a downstream conveyance path within a third document conveyance path 53. Thus, the CIS 150 is configured to read the side of a document opposite from the side read in the first embodiment.

In the first conveyance mode illustrated in FIG. 13A, on a conveyance-path upper cover 121, a conveyance-path upper-cover indicator 122 is visible which includes an indicator 122A indicating the back side of a document sheet and an arrow indicator indicating the direction toward the downstream side in the direction of conveyance of the document. These indicators are formed by indented marks. In reading documents in this state, the last document page is discharged onto a document discharge tray 18 with its back side in contact with the surface of the document discharge tray 18. Subsequent pages are then discharged one by one, and the first page is discharged with its front side up.

In the second conveyance mode illustrated in FIG. 13E, on a conveyance-path lower cover 123, a conveyance-path lower-cover indicator 124 is visible which includes an indicator 124A indicating the front side of a document sheet and an arrow indicator indicating the direction toward the downstream side in the direction of conveyance of the document. These indicators are formed by indented marks as well. In reading documents in this state, the last document page is discharged onto the document discharge tray 18 with its back side in contact with the surface of the document discharge tray 18. Subsequent pages are then discharged one by one, and the first page is discharged with its front side up.

As described above, according to this embodiment too, when placing a sheet onto the placement unit, the user can place the sheet checking whether its front and back sides are oriented correctly. This prevents a situation where the user does not notice that the front and back sides have been oriented in the opposite way until obtaining the result of reading the document. Hence, the operability of the apparatus is improved.

(Fifth Embodiment)

A fifth embodiment of the present invention relates to a mode using both the CIS 30, used in the scanner described above in the first embodiment, and the CIS 150, described above in the fourth embodiment. In other words, the fifth embodiment is a configuration capable of reading document information on both sides of a document sheet by conveying the document sheet once.

FIG. 14A and FIG. 14E are views schematically illustrating cross sections of a document conveying reading unit in a first conveyance mode and a second conveyance mode, respectively, according to the fifth embodiment of the present invention. FIGS. 14B, 14C and 14D illustrate enlarged view of XIVB portion, XIVC portion and XIVD portion in FIG. 14A, respectively. FIGS. 14F, 14G and 14H illustrate enlarged view of XIVF portion, XIVG portion and XIVH portion in FIG. 14E, respectively. Elements having similar functions to those in the above first embodiment are denoted by the same reference signs, and their description will be omitted.

In the first conveyance mode illustrated in FIG. 14A, on a conveyance-path upper cover 131, a conveyance-path upper-cover indicator 132 is visible which includes an indicator 132A indicating the front side of a document sheet and an arrow indicator indicating the direction toward the downstream side in the direction of conveyance of the document. These indicators are formed by indented marks. In reading documents in this state, the first document page is discharged onto a document discharge tray 18 with its front side in contact with the surface of the document discharge tray 18. Subsequent pages are then discharged one by one, and the last page is discharged with its back side up.

In the second conveyance mode illustrated in FIG. 14E, on a conveyance-path lower cover 133, a conveyance-path lower-cover indicator 134 is visible which includes an indicator 134A indicating the back side of a document sheet and an arrow indicator indicating the direction toward the downstream side in the direction of conveyance of the document. These indicators are formed by indented marks as well. In reading documents in this state, the first document page is discharged onto the document discharge tray 18 with its front side in contact with the surface of the document discharge tray 18. Subsequent pages are then discharged one by one, and the last page is discharged with its back side up.

As described above, according to this embodiment too, when placing a sheet onto the placement unit, the user can place the sheet checking whether its front and back sides are oriented correctly. This prevents a situation where the user does not notice that the front and back sides have been oriented in the opposite way until obtaining the result of reading the document. Hence, the operability of the apparatus is improved.

Note that in the fifth embodiment, document information on both sides of a document can be read by conveying the document once. Thus, in a case of simultaneously reading both sides of a document, the information on both sides of the document can be extracted without restriction on the orientation of the front and back sides of the document in the placement of the document. However, in a case of reading a thick double-sided photographic document such as double-sided photographic paper, the front and back sides are desired to be read at the same quality. In this case, the front and back sides may be individually read once only by the first reading sensor by conveying the document through the straight path. In this way, variation due to a plurality of reading sensors is eliminated. Considering this point, an arrangement of front-back indicators like the one in this embodiment is preferred.

Figure 15A:
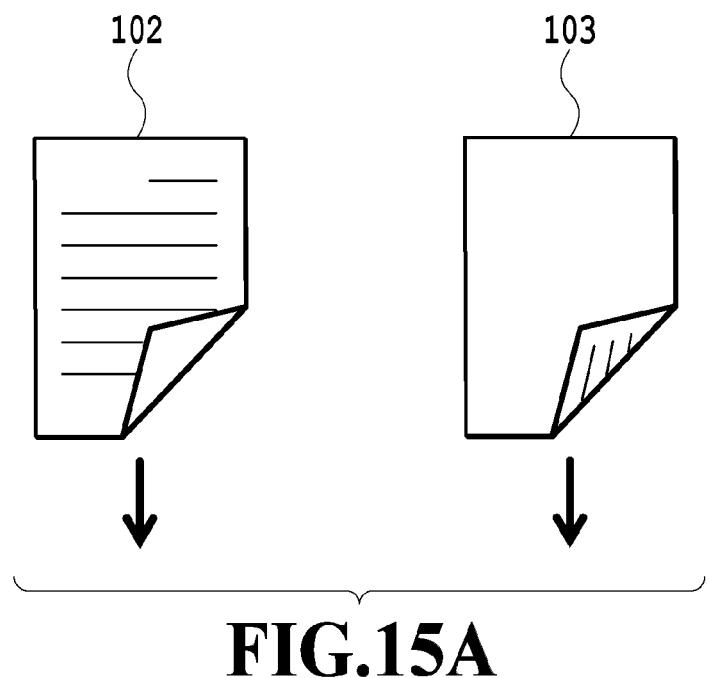
FIG. 15A and FIG. 15B are views illustrating the designs of indicators according to some embodiments.
Figure 15B:
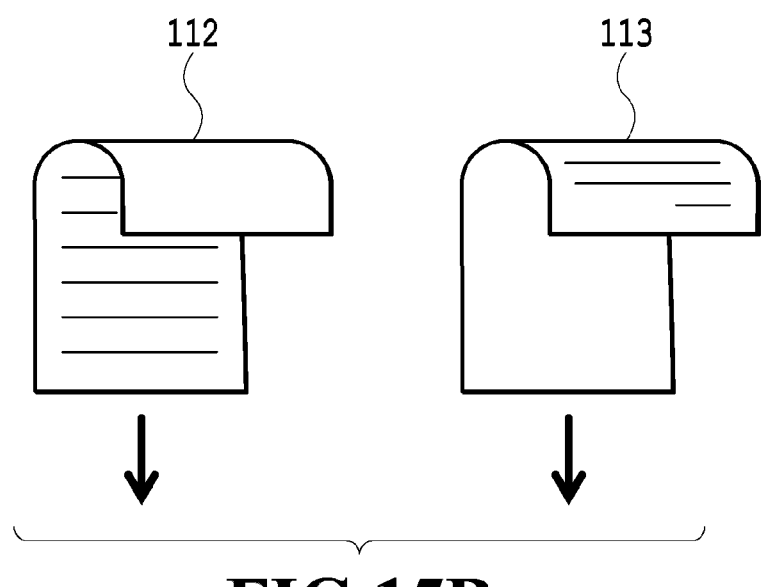

Meanwhile, FIG. 15A and FIG. 15B are views illustrating the designs of indicators according to some embodiments of the present invention. FIG. 15A illustrates the indicators mentioned above in the first embodiment, indicating placement of a document with its front side up and placement of a document with its back side up, respectively. Each of the indicators is a combination of a pattern that includes a figure representing an outer shape of a document with a fold, indicating both the front and back sides of the document, and an arrow pointing in the direction of insertion of the document. FIG. 15B illustrates indicators each being a combination of a pattern using a figure representing an outer shape of a document curled in an arched shape to indicate both the front and back sides of the document, and an arrow pointing in the direction of insertion of the document. Both sets of indicators are designed as patterns allowing the user to easily recognize the front and back sides of a document and the direction of insertion, thereby preventing misplacement of a document onto the reading conveying apparatus and improving the operability of the apparatus as a whole.

As for the form of each indicator, besides using indented or projected marks formed by utilizing molding of the cover member as in this embodiment, double molding, for example, may be used in which a material different in color from the base material is formed in the indented portions of the indicator. In this way, the visibility is further enhanced. Alternatively, an indicator may be directly printed on the cover surface, or a label on which an indicator is printed may be attached to the cover surface. In this way too, a similar advantageous effect can be achieved. Further, as for the positions where the indicators are arranged, besides the arrangement in the above embodiments, the indicators may be arranged at nearby positions that are not on the conveying unit. For example, it is effective to additionally provide an indicator similar to the conveyance-path upper-cover indicator on a document placement tray 14 and an indicator similar to the conveyance-path lower-cover indicator on a document feed guide 203.

As described above, according to the fourth embodiment and the fifth embodiment, the user can check without fail whether the front and back sides of a document sheet are oriented correctly when placing the document sheet on the placement unit.

(Sixth Embodiment)

Figure 16A:
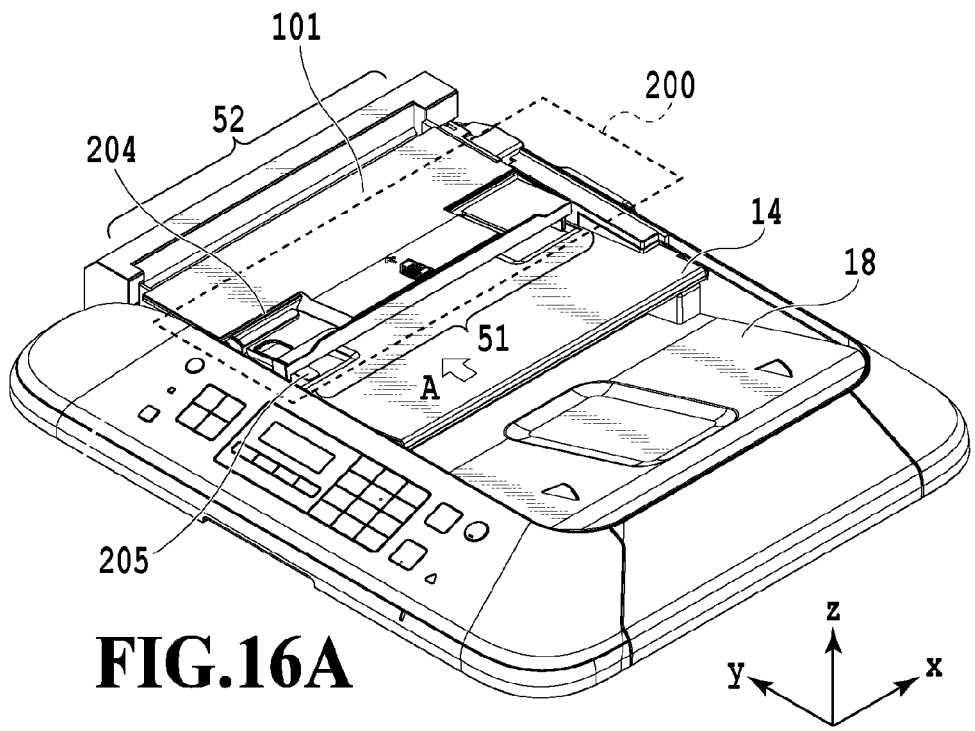
FIG. 16A and FIG. 16B are perspective views illustrating the configuration of a side guide unit of a placement tray in a sixth embodiment.
Figure 16B:
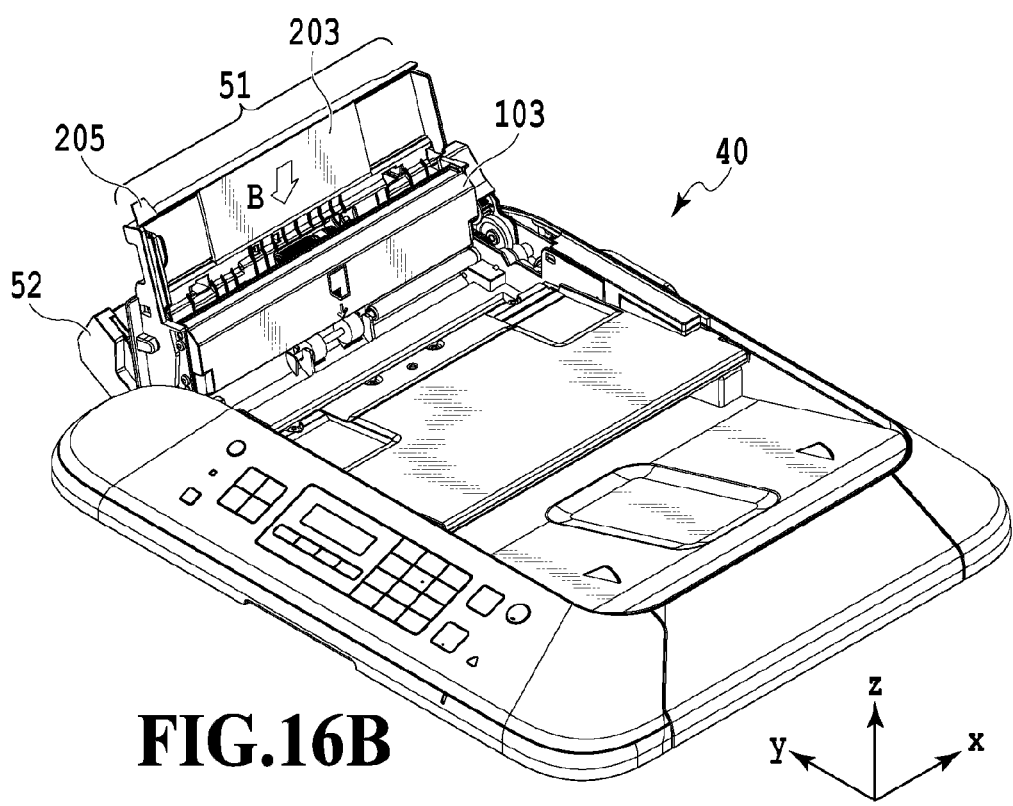
Figure 17:
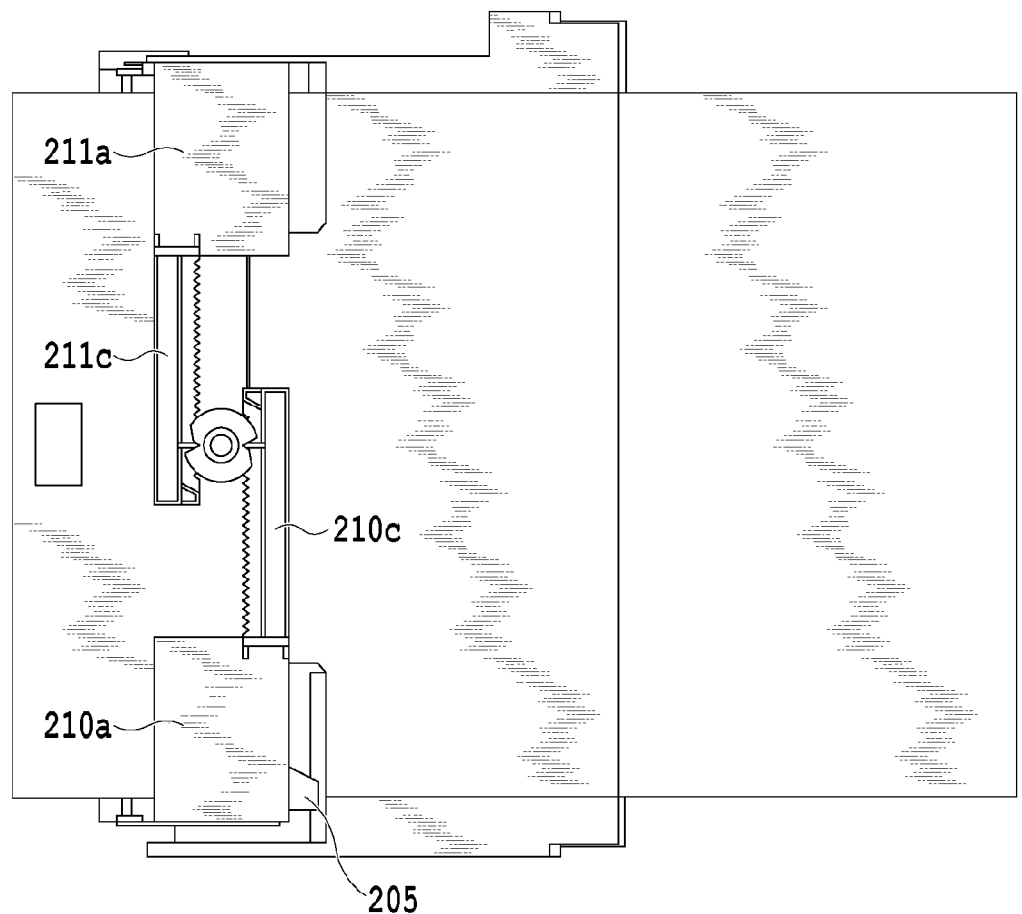
FIG. 17 is a view illustrating side guides of the placement tray in the sixth embodiment.

FIG. 16A and FIG. 16B are perspective views illustrating the configuration of a side guide unit of a placement tray 14 of a document reading conveying unit 1 according to a sixth embodiment of the present invention. Also, FIG. 17 is a view explaining the positional relation between side guides on the placement tray in the sixth embodiment. In these figures, similar elements to elements described in the first embodiment are denoted by the same reference signs, and description thereof will be omitted.

As illustrated in FIG. 16A, FIG. 16B, and FIG. 17, in this embodiment, as an operation portion on which the user places his or her finger, a projection 205 is provided on a side guide base 210*a*. The projection 205 projects in parallel to placed sheets toward the upstream side in the sheet conveyance direction. This projection 205 is formed such that its projecting portion extends in parallel to the document-sheet conveyance direction. The projection 205 is a portion which the user pinches with his or her fingers to slide the guiding member. This projection 205 is formed on substantially the same plane as the side guide base 210*a* and is arranged near a line extending from a rack part 210*c*. Specifically, similarly to what has been described above in the first embodiment, the operation portion is provided at substantially the same position in the z direction as the positions of the centers of gravity of the members that are configured to move for a sliding operation; in addition, the position of the projection 205 is set to be substantially the same in the y direction as the position of the center of gravity of the rack part 210*c*. In this way, in a case where the user holds the projection 205 and performs an operation to slide the side guide 210, the operating force from the user is transmitted substantially straight to the rack part 210*c* through the side guide base 210*a*. Unnecessary force that rotates the side guide relative to the pinion is not generated, which allows smooth sliding movement of the side guide.

Note that as illustrated in FIG. 17, the arrangement of the rack parts 210*c* and 211*c* in this embodiment is opposite to the arrangement illustrated in FIG. 8A and FIG. 8B. Here, this arrangement is to align the projection 205 to the rack part 210C on a substantially straight line. Besides this point, the rack parts illustrated in FIG. 8A and FIG. 8B and the rack parts illustrated in FIG. 17 are not different from each other in function.

As described above, according to this embodiment, a sheet conveying apparatus is obtained which includes a side guide mechanism capable of a smooth sliding operation.

(Other Embodiments)

The above embodiments relate to modes in which documents are conveyed with the conveyance path switchable using two rotational positions of the first document conveyance path. However, the application of the present invention is not limited to these modes. It is obvious from the above description that the present invention is applicable also to modes in which documents are conveyed with the conveyance path switchable using three or more rotational positions of the first document conveyance path.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-136812, No. 2016-136815, No. 2016-136853 and No. 2016-136854 filed Jul. 11, 2016, respectively, which are hereby incorporated by reference herein in their entirety.

What is claimed is:

1. A reading apparatus comprising:
   a document placement table on which a document is placeable;
   a reading unit configured to read the document placed on the document placement table;
   a first conveying unit configured to load a plurality of documents and to convey the loaded documents individually toward the reading unit, the first conveying unit being capable of moving to a first position located above the document placement table and a second position rotated from the first position; and
   a second conveying unit configured to be capable of moving to a third position and a fourth position rotated from the third position, the third position being a position to which a conveyed document from the first conveying unit in the first position is conveyed,
   wherein when the first conveying unit is in the second position, the conveyed document from the first conveying unit is conveyed to the reading unit without passing through the second conveying unit.

2. The sheet conveying apparatus according to claim 1, wherein
   the first conveying unit is positioned in the second position by rotating more than 90 degrees from the first position, the first position being nearly horizontal, and
   the second conveying unit retracts with movement of the first conveying unit from the first position toward the second position.

3. The sheet conveying apparatus according to claim 2, further comprising a third conveying unit, wherein the third conveying unit is fixed regardless of whether the first conveying unit is rotated.

4. The sheet conveying apparatus according to claim 1, wherein
   the first conveying unit and the second conveying unit are engaged with each other through cam portions, and
   the second conveying unit rotates with rotation of the first conveying unit from the first position toward the second position.

5. The sheet conveying apparatus according to claim 1, wherein
   the first conveying unit and the second conveying unit include a driving mechanism including:
   a first pulley including a shaft configured to rotate with rotation of the first conveying unit,
   a second pulley including a shaft configured to rotate with rotation of the second conveying unit, and
   a belt wound around the first pulley and the second pulley, and
   the second conveying unit rotates with rotation of the first conveying unit from the first position toward the second position.

6. The sheet conveying apparatus according to claim 1, wherein the first conveying unit separates and feeds the plurality of documents one by one.

7. The sheet conveying apparatus according to claim 1, wherein the reading unit is configured to read an image on the conveyed document.

\* \* \* \* \*